(12) United States Patent
Shmueli Friedland et al.

(10) Patent No.: US 11,524,627 B2
(45) Date of Patent: Dec. 13, 2022

(54) ADAPTIVE INTERACTION SYSTEM WITH OTHER ROAD USERS

(71) Applicant: GM GLOBAL TECHNOLOGY OPERATIONS LLC, Detroit, MI (US)

(72) Inventors: Yael Shmueli Friedland, Tel Aviv (IL); Asaf Degani, Raanana (IL); Claudia V. Goldman-Shenhar, Mevasseret Zion (IL); Gila Kamhi, Zichron Yaakov (IL); Julien P. Mourou, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 92 days.

(21) Appl. No.: 16/937,054

(22) Filed: Jul. 23, 2020

(65) Prior Publication Data
US 2022/0024376 A1  Jan. 27, 2022

(51) Int. Cl.
  *B60Q 1/50* (2006.01)
  *B60Q 1/44* (2006.01)
  *B60Q 1/26* (2006.01)

(52) U.S. Cl.
  CPC .............. *B60Q 1/50* (2013.01); *B60Q 1/2607* (2013.01); *B60Q 1/2611* (2013.01); *B60Q 1/442* (2013.01)

(58) Field of Classification Search
  CPC ...... B60Q 1/50; B60Q 1/2607; B60Q 1/2611; B60Q 1/442; G08G 1/166
  See application file for complete search history.

(56) References Cited

U.S. PATENT DOCUMENTS

| | | | | |
|---|---|---|---|---|
| 9,953,538 B1* | 4/2018 | Matthiesen | ............ | B60Q 1/543 |
| 10,172,409 B1* | 1/2019 | Andon | .................... | B60Q 9/008 |
| 10,414,395 B1* | 9/2019 | Sapp | ........................ | G08G 1/00 |
| 10,906,456 B2* | 2/2021 | Sorokin | ................ | B60Q 5/006 |
| 2011/0140913 A1* | 6/2011 | Montenero | ........ | G08B 21/0233 |
| | | | | 340/870.07 |
| 2013/0261887 A1* | 10/2013 | Raz | ........................ | B60Q 5/00 |
| | | | | 701/36 |
| 2016/0231746 A1* | 8/2016 | Hazelton | ............... | G01S 13/867 |
| 2018/0012492 A1* | 1/2018 | Baldwin | ............... | B60W 10/18 |
| 2019/0100198 A1* | 4/2019 | Hakki | .................... | B60Q 9/008 |
| 2020/0047668 A1* | 2/2020 | Ueno | .................... | B60W 50/14 |
| 2020/0164799 A1* | 5/2020 | Nowakowski | ............ | B60R 1/00 |
| 2020/0211368 A1* | 7/2020 | Ueno | ..................... | G06Q 40/08 |
| 2020/0216062 A1* | 7/2020 | Hakki | ..................... | B64C 15/14 |
| 2020/0242922 A1* | 7/2020 | Dulberg | ................ | G08G 1/164 |
| 2020/0349843 A1* | 11/2020 | Liu | ........................ | B60R 21/00 |
| 2020/0377012 A1* | 12/2020 | Saez | ..................... | B60Q 1/525 |
| 2020/0380273 A1* | 12/2020 | Saez | .................... | G06K 9/6278 |
| 2020/0398743 A1* | 12/2020 | Huber | ................... | B60Q 5/006 |
| 2020/0402404 A1* | 12/2020 | Balasubramanian | ....................... | |
| | | | | H04W 72/0406 |
| 2021/0065551 A1* | 3/2021 | Manohar | ................ | G08G 1/161 |
| 2021/0114514 A1* | 4/2021 | Karol | .................... | B60Q 5/006 |
| 2021/0118303 A1* | 4/2021 | Chan | .................... | G08G 1/0112 |
| 2021/0152992 A1* | 5/2021 | Balasubramanian | ....................... | |
| | | | | H04L 5/1469 |

(Continued)

*Primary Examiner* — Hoi C Lau
(74) *Attorney, Agent, or Firm* — Cantor Colburn LLP

(57) ABSTRACT

A system and method for operating an automated vehicle. A sensor is configured to monitor an ORU (other road user) external to the automated vehicle thereby identifying the ORU with respect to the automated vehicle. A processor determines a state of the ORU and a context of the ORU and communicates a message to the ORU based on the determined state of the ORU and the context of the ORU.

20 Claims, 28 Drawing Sheets

(56) References Cited

U.S. PATENT DOCUMENTS

2021/0304611 A1\* 9/2021 Hughes ................ G05D 1/0214
2021/0334854 A1\* 10/2021 Ueno ..................... G06Q 30/02
2021/0339763 A1\* 11/2021 Just ........................ H04W 4/40
2021/0383686 A1\* 12/2021 Xu ....................... G08G 1/0116

\* cited by examiner

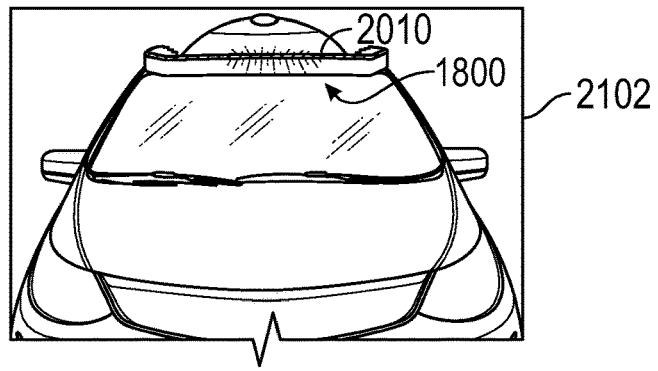
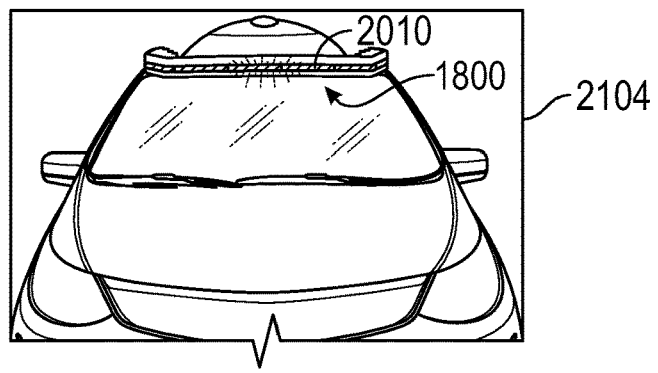
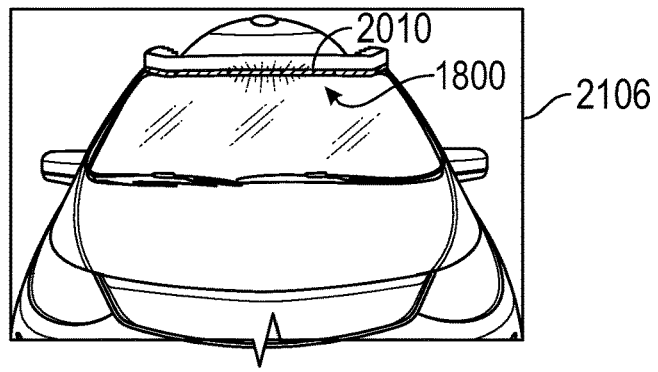
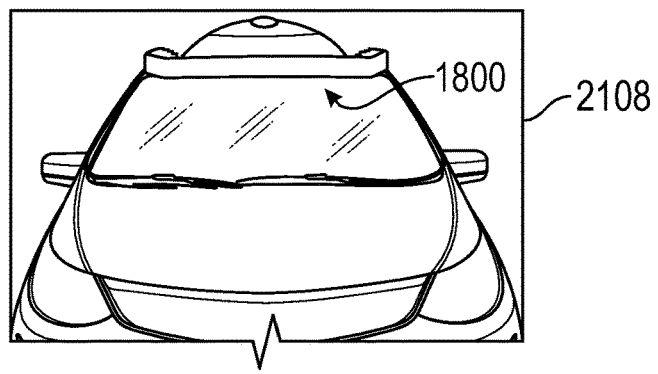
FIG. 21

ADAPTIVE INTERACTION SYSTEM WITH OTHER ROAD USERS

INTRODUCTION

The subject disclosure relates to autonomous vehicles (Levels 4-5) and partially automated vehicles (Levels 2-3) and, in particular, to a system and method for interactive communication between these vehicles and other road users (ORUs).

An autonomous and/or partially automated vehicle can include sensors that recognize, monitor and track other road user (ORUs), such as a pedestrian, a cyclist, etc. in the vicinity of the vehicle, and perform one or more actions to navigate through a road section based on the locations and velocities of the ORUs. However, as long as an ORU is unaware of the actions or intentions of the autonomous vehicle, the ORU can make poor choices and cause greater confusion, potentially hindering safe traffic flow. There is also a potential for dangerous interactions between the vehicle and the ORU when one does not understand the other and attempts to accommodate the other. Accordingly, it is desirable to be able to communicate an intention or intended action of an autonomous or partially automated vehicle to the ORU in order to facilitate safer traffic flow and better ORU interactions.

SUMMARY

In one exemplary embodiment, a method of operating an automated vehicle is disclosed. An ORU (other road user) is identified with respect to the automated vehicle. A state of the ORU and a context of the ORU is determined. A message is communicated to the ORU based on the determined state of the ORU and the context of the ORU.

In addition to one or more of the features described herein, the message is selected from a communication protocol between the automated vehicle and the ORU at a lane crossing. The method further includes identifying the lane crossing using a mapping application and activating a communication protocol based on the location of the ORU with respect to the lane crossing when the automated vehicle approaches the lane crossing of the mapping application. The method further includes communicating the message by displaying a visual signal on at least one of a panel of the automated vehicle, a panel within windshield of the automated vehicle, an LED strip, and a road. The visual signal is parameterized by at least one of a shape of the visual signal, a size of the visual signal, a density of the visual signal, an intensity of the visual signal, a contrast level of the visual signal, a granularity or resolution of the visual signal, a color of the visual signal, a hue of the visual signal, a graphic pattern of the visual signal, a direction of movement of the visual signal, a speed of directional movement of the visual signal, a timing of the visual signal, a duration of the visual signal, a period of the visual signal (repetition rate in a repeated visual signal pattern), a repetition number of the visual signal, and a waveform of the pulsation of the visual signal (rectangular, triangular, sinusoidal, sawtooth). In various embodiments, the visual signal includes a representation of the ORU, wherein a granular resolution of the ORU increases as a distance between the automated vehicle and ORU decreases. The method further includes at least one of showing the visual signal as an animation that is adapted to a level of vulnerability assessed with respect to the ORU and increasing an intensity and reducing a period of the visual signal when a subjective threat is assessed with respect to the ORU. The message corresponds to a mode of the automated vehicle that is at least one of a driving mode, an awareness mode, an intent to stop mode, a deceleration mode, a warning mode, a stopping mode, a stopped and waiting mode, a yielding right of way mode, an ORU space respecting mode, an ORU protection mode, an acceleration warning mode, an intent to drive mode, and an acceleration mode. The method further includes communicating the message to perform at least one of expressing a general awareness of the road using particles on a display panel having an intensity that changes according to a temporally sinusoidal waveform, attracting an attention of the ORU by converging the particles into a line having an intensity that changes according to a temporally triangular waveform, indicating one of acceleration and deceleration by moving a line pattern or dashed line pattern at least one of vertically or horizontally, sending a warning by flashing a radially expanding light, pulsing according to a temporally rectangular waveform, and enhancing a motion of the automated vehicle to the ORU without visually capturing the attention of the ORU. The method further includes projecting an image at a location of the road to indicate a safety zone with respect to the automated vehicle.

In another exemplary embodiment, a system for operating an automated vehicle is disclosed. The system includes a sensor and a processor. The sensor is configured to monitor an ORU (other road user) external to the automated vehicle. The processor is configured to determine a state of the ORU and a context of the ORU and communicate a message to the ORU based on the determined state of the ORU and the context of the ORU.

In addition to one or more of the features described herein, the message is selected from a communication protocol between the automated vehicle and the ORU at a lane crossing. The processor is further configured to identify a lane crossing using a mapping application and activating a communication protocol based on the location of the ORU with respect to the lane crossing when the automated vehicle approaches the lane crossing of the mapping application. The processor is further configured to communicate the message by displaying a visual signal on at least one of a panel of the automated vehicle, a panel within a windshield of the automated vehicle, an LED strip, and a road. The visual signal is parameterized by at least one of a shape of the visual signal, a size of the visual signal, a density of the visual signal, an intensity of the visual signal, a contrast level of the visual signal, a granularity or resolution of the visual signal, a color of the visual signal, a hue of the visual signal, a graphic pattern of the visual signal, a direction of movement of the visual signal, a speed of directional movement of the visual signal, a timing of the visual signal, a duration of the visual signal, a period of the visual signal (repetition rate in a repeated visual signal pattern), a repetition number of the visual signal, and a waveform of the pulsation of the visual signal (rectangular, triangular, sinusoidal, sawtooth). In one embodiment, the visual signal includes a representation of the ORU having granular resolution that increases as a distance between the automated vehicle and ORU decreases. The processor is further configured to coordinating the visual signal with an audio signal. The message corresponds to a mode of the automated vehicle that is at least one of a driving mode, an awareness mode, an intent to stop mode, a deceleration mode, a warning mode, a stopping mode, a stopped and waiting mode, a yielding right of way mode, an ORU space respecting mode, an ORU protection mode, an acceleration warning mode, an intent to drive mode, and an acceleration mode.

The processor is further configured to communicate the message by performing at least one of expressing a general awareness of the road using particles on a display panel having an intensity that changes according to a temporally sinusoidal waveform, attracting an attention of the ORU by converging the particles into a line having an intensity that changes according to a temporally triangular waveform, indicating one of acceleration and deceleration by moving a line pattern or dashed line pattern at least one of vertically or horizontally, sending a warning by flashing a radially expanding light, pulsing according to a temporally rectangular waveform, and enhancing a motion of the automated vehicle to the ORU without visually capturing the attention of the ORU. The processor is further configured to project an image at a location of the road to indicate a safety zone with respect to the automated vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 21 shows the panel displaying a visual message indicating a deceleration and stopping mode;

DETAILED DESCRIPTION

Figure 1:
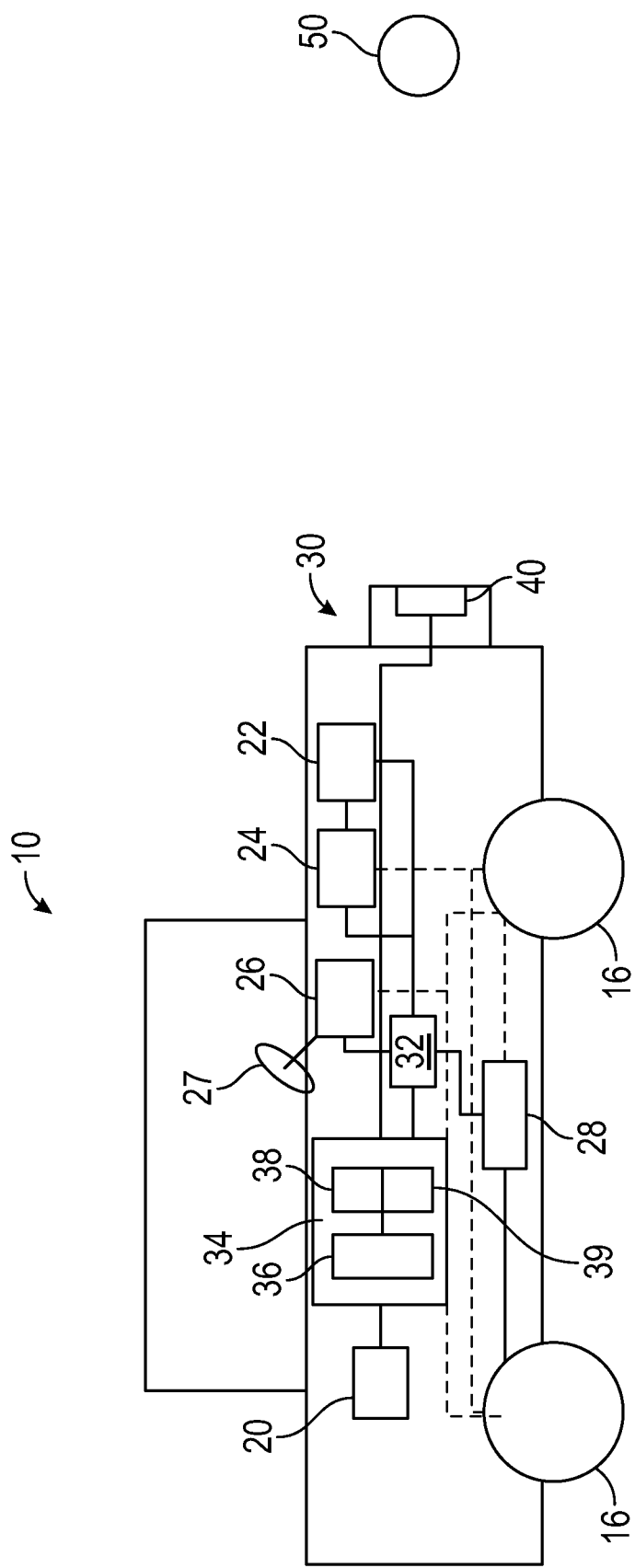
FIG. 1 shows an automated vehicle, in accordance with various embodiments.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows an automated vehicle (AV) 10. An AV 10 can refer to either a partially automated vehicle (Level 2 and Level 3) or an autonomous vehicle (Level 4 and Level 5). A Level 2 system indicates "partial automation", referring to the driving mode-specific execution by one or more driver assistance systems of both steering and acceleration/deceleration using information about the driving environment and with the expectation that the human driver performs all remaining aspects of the dynamic driving task. A Level 3 system indicates "conditional automation", indicating the driving mode-specific performance by an automated driving system of all aspects of the dynamic driving task with the expectation that the human driver will respond appropriately to a request to intervene. A Level 4 system indicates "high automation", referring to the driving mode-specific performance by an automated driving system of all aspects of the dynamic driving task, even if a human driver does not respond appropriately to a request to intervene. A Level 5 system indicates "full automation", referring to the full-time performance by an automated driving system of all aspects of the dynamic driving task under all roadway and environmental conditions that can be managed by a human driver. Although the AV 10 is depicted as a passenger car, it should be appreciated that any other vehicle including motorcycles, trucks, sport utility vehicles (SUVs), recreational vehicles (RVs), etc., can also be used.

The AV 10 generally includes at least a navigation system 20, a propulsion system 22, a transmission system 24, a steering system 26, a brake system 28, a sensor system 30, an actuator system 32, and a controller 34. The navigation system 20 determines a road-level route plan for automated driving of the AV 10. The propulsion system 22 provides power for creating a motive force for the AV 10 and can, in various embodiments, include an internal combustion engine, an electric machine such as a traction motor, and/or a fuel cell propulsion system. The transmission system 24 is configured to transmit power from the propulsion system 22 to two or more wheels 16 of the AV 10 according to selectable speed ratios. The steering system 26 influences a position of the two or more wheels 16. While depicted as including a steering wheel 27 for illustrative purposes, in some embodiments contemplated within the scope of the present disclosure, the steering system 26 may not include a steering wheel 27. The brake system 28 is configured to provide braking torque to the two or more wheels 16.

The sensor system 30 can include a radar system 40 that senses an object 50 in an exterior environment of the AV 10 and provides various parameters of the object 50 relative to the AV 10. Such parameters can be provided to the controller 34, which can use these parameters to identify, recognize, track and monitor the one or more objects. The sensor system 30 also includes additional sensors, such Lidar, acoustic transducers, digital cameras, etc. to sense object 50. The object 50 can include one or more road users (ORUs) within the environment, such as pedestrians, bicycles, motorcycles, wheelchairs, baby trollies, scooters, etc. The object 50 can also be a non-moving object. The sensor system 30 can also be used to obtain traffic data, such as information regarding traffic signals and signs, weather, maps, cellular activity, etc.

The controller 34 builds a trajectory for the AV 10 based on the output of sensor system 30. The controller 34 can provide the trajectory to the actuator system 32 to control the propulsion system 22, transmission system 24, steering system 26, and/or brake system 28 in order to navigate the AV 10 with respect to the object 50. The controller 34 includes a processor 36 and a computer readable storage device or storage medium 38. The computer readable storage medium 38 includes programs or instructions 39 that, when executed by the processor 36, operate the automated vehicle based on sensor system outputs. The computer readable storage medium 38 may further include programs or instructions 39 that when executed by the processor 36, determines a state of object 50 in order to allow the automated vehicle to drive with respect to the object. In particular, the processor 36 can identify, recognize, track and monitor ORUs and communicate a message to the ORU based on a state of the ORU, a need of the ORU and/or a state of the AV 10.

The processor 36 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 38 may include volatile and nonvolatile storage in read-only memory (ROM), random-access memory (RAM), and keep-alive memory (KAM), for example. KAM is a persistent or non-volatile memory that may be used to store various operating variables while the processor 36 is powered down. The computer-readable storage device or media 38 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the AV 10.

In one mode of operation, the processor 36, receives signals indicating a presence of one or more ORUs. The processor 36 then determines an action to take based various states of the one or more ORUs, weather and road conditions, traffic conditions, etc. Upon selecting the action, the processor 36 transmits a message to the one or more ORUs using the methods disclosed herein in order to convey its states and intentions to the one or more ORUs. The processor 36 therefore engages in a one-way or two-way communication with the one or more ORUs.

Figure 2:
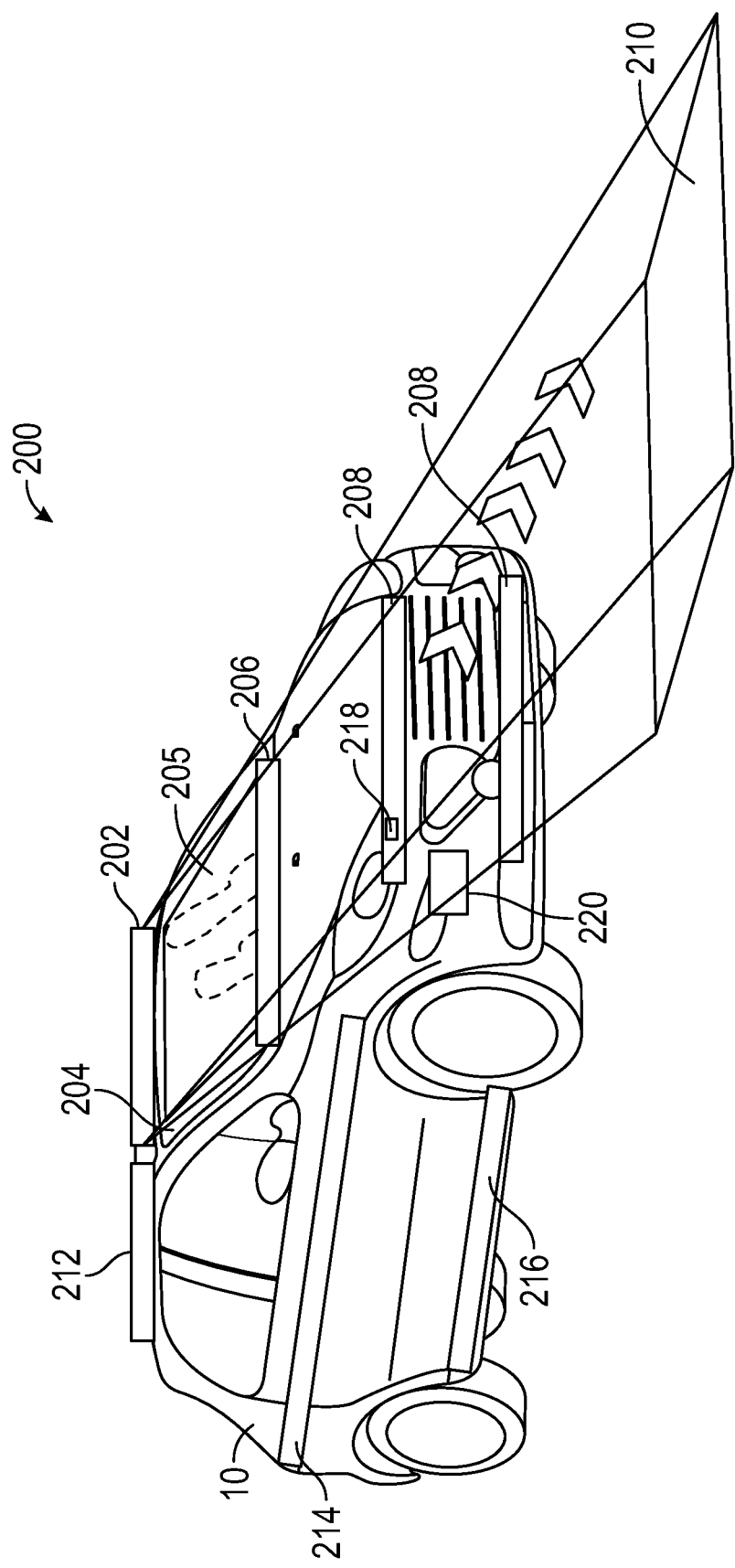
FIG. 2 shows a perspective view of the automated vehicle.

FIG. 2 shows a perspective view 200 of the AV 10 in an embodiment. The AV 10 incudes one or more displays or panels that can be used to communicate or display a message to an ORU. The panels can be an LED (light emitting diode) display or other thin film panels for displaying icons, symbols or messages that can be read and understood by the ORU. Alternatively, a display can be an LED string including a plurality of LEDs aligned in a one-dimensional string. In one embodiment, the AV 10 includes a front roof panel 202 which can extend from a driver's side to a passenger's side over a windshield 204 of the AV 10. The AV 10 can include a front hood panel 206 that extends across the bottom of the windshield 204. The front roof panel 202 and/or the front hood panel 206 can display its message or shine a light onto a selected road projection area 210 at a selected location from the AV 10 to be read or viewed by the ORU. Alternatively, a projector (not shown) can shine a light into the road projection area 210. Panels 208 can be affixed at or near a front bumper and/or grill of the AV 10. Additional side panels 212, 214, 216 can be affixed to one or more sides of the AV 10. In one embodiment, front roof panel turns at the sides of the vehicle to extend toward the rear of the vehicle, so that an icon, symbol or message at the front roof panel 202 can be read by ORUs that are not directly in front of the AV 10.

The windshield 204 itself can include an LED panel 205 that extends over some or all of the windshield. The LED panel 205 is also referred to herein as a "windshield display." The windshield display can have an upper section which is generally shaded or tinted with respect to the rest of the windshield display. In various embodiments, the LED panel 205 can be made thin enough to allow a driver or passenger of the AV 10 to be able to see through the LED panel 205 to the outside of the AV 10. It is to be understood that in various embodiments, some or all or the panels of FIG. 2 can be included in an AV 10 in any combination. In various embodiments, the processor 36 can be communicatively coupled to the panels in order to sends messages or signals to be displayed at the panels. In addition, the panels can have speakers (e.g., speaker 218) therein for transmitting an audible signal. Alternatively, speakers such as speaker 220 can be provided at the AV 10 separately from the panels.

In various operations, the AV 10 determines a type of message to display at the panels based on the state of the ORU as well as other variables. These other variables can include a road state, an environmental state, an AV state, and a driver's state. The AV 10 then communicates its intended action to the ORU by displaying icons, symbols or messages and/or audible sounds that can be understood by the ORU, thereby allowing the ORU to be able to understand the intended action of the AV and to act accordingly. For example, the AV 10 can determine from an ORU's location, gestures, velocity, etc. that the ORU intends to cross a street section ahead of the AV 10. The AV 10 can decide to slow down and allow the ORU to cross the street and then communicate its intention to the ORU. Messages can be communicated to the ORU until the interaction with the ORU is complete. An intention of the ORU can also be interpreted at the AV 10 based on, for example, a hand gesture, ORU motion, etc, thus allowing a two-way communication between AV 10 and ORU. The ORU can then cross the street secure in the knowledge that the AV 10 is aware of his presence and is acting so as not to harm the ORU. These messages can be used to replace eye contact between the driver and the ORU.

In partially automated (Level 2 and Level 3) vehicles, the messages that are displayed are generally limited to messages for deceleration, actual stopping, intent to drive and acceleration. The activation of a message for partially automated vehicles can be caused by an operation at the vehicle (or activation of a part of the vehicle) that affects a motion of the vehicle or a state of the vehicle. For example, the display of a message such as deceleration and stopping can be linked to the car brakes, such that when the brakes are activated, the message for decelerating and then for stopping is displayed. Similarly, display of a message such as "intent to drive" can be linked to activation of the gas pedal (intent to drive). Deceleration and acceleration messages can be linked to data from a CANBUS (Controller Area Network bus), and other warnings can be linked to data from an advanced driver-assistance system (ADAS).

In various embodiments, the processor 36 selects the media through which the message is communicated. Content can be assigned to different media of presentation platforms, such as audio media (via speakers) or visual media (via panels) and select sub-modalities within each medium to maximize the degree to which the message is communicated to and/or perceived by the ORU. For example, a change in a motion of a visual signal such as a light spot at a panel can be set to correspond to a change of speed of the vehicle. A projection of silhouettes on the windshield display enables ORUs to identify themselves as being recognized by the vehicle. Short sounds delivered at selected times (e.g., stopping & intent to drive) can be used to communicate vehicle state transitions, especially to blind or inattentive ORUs. In various embodiments, the processor 36 performs media realization to maximize communication value using inobtrusive principles. Visual manipulations aim to show awareness to surrounding objects, meet functional and emotional needs of pedestrians, and enhance the car's motions while avoiding visual capture of the attention of the ORU. Media can be coordinated so that the visual message and audio message are synchronized with each other and with the vehicle's state.

Figure 2A:
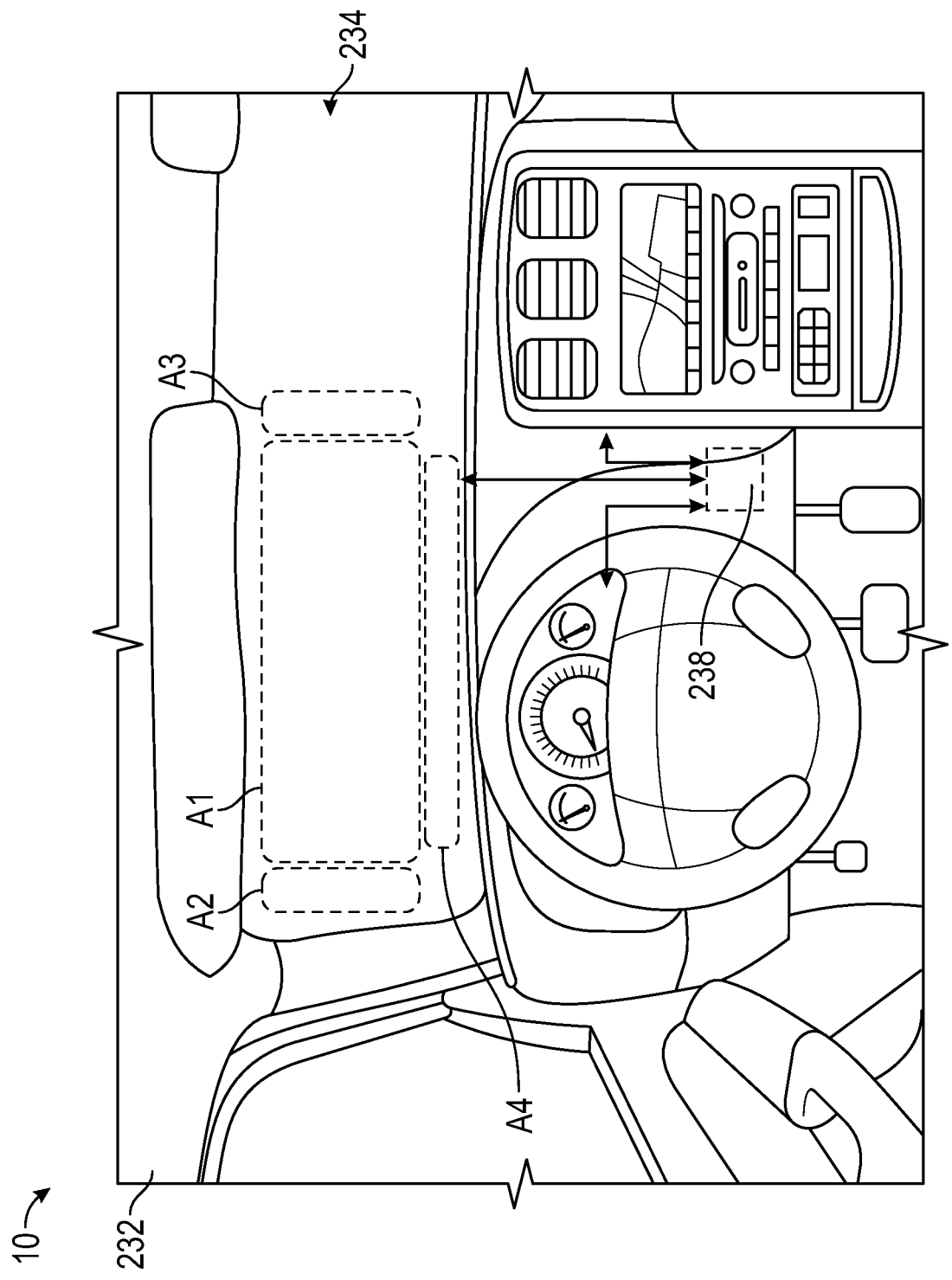
FIG. 2A shows a perspective view of a windshield of the automated vehicle from inside the vehicle, in one embodiment.

FIG. 2A shows a perspective view of a windshield of the AV 10 from inside the vehicle, in one embodiment. A front windshield unit 234 is mounted to the vehicle body 232 of the AV 10. The front windshield unit 234 includes an integral dual-sided, laminated-glass transparent display device. It is to be understood that the display device can be applied to other glass surfaces of the vehicle, including, rear windows, side door windows, vent glass, quarter glass, sunroofs, moonroofs, etc. The front windshield unit 234 may be configured as an Enhanced Vision System (EVS) that is operable to dynamically display and dynamically update graphical images. In one embodiment, the front windshield unit 234 of FIG. 2A presents four transparent display areas A1-A4, each of which is configured to display an image within discrete segments of a driver's field of vision. In various aspects, the transparent display areas A1-A4 form the windshield display or LED panel 205 of FIG. 2.

The display areas A1-A4 of the front windshield unit 234 communicate with a programmable electronic control unit (ECU) 238. The ECU 238 is programmed to govern operation of the front windshield unit 234, among other things. The ECU 238 may be designed with a set of control routines executed to provide the desired functions. Control routines are executed, such as by processor 36. The ECU 238 may systematically monitor various sensors, system components, and/or other relevant inputs, both manual and automated, and identify information based on these monitored inputs that will be relayed to the vehicle occupants or to passing pedestrians, vehicles, etc., and determine a graphical representation of the selected information. This ECU 238 may communicate directly with various systems, subsystems, and components, or the ECU 238 may alternatively or additionally communicate over a distributed computing network, such as a LAN/CAN system, a satellite system, the Internet, etc. An EVS graphics engine, embodied as a dedicated software application or a discrete control module within the ECU 238, for example, includes display software or processor-executable code that translates data and user requests into graphical representations of desired information.

Figure 3:
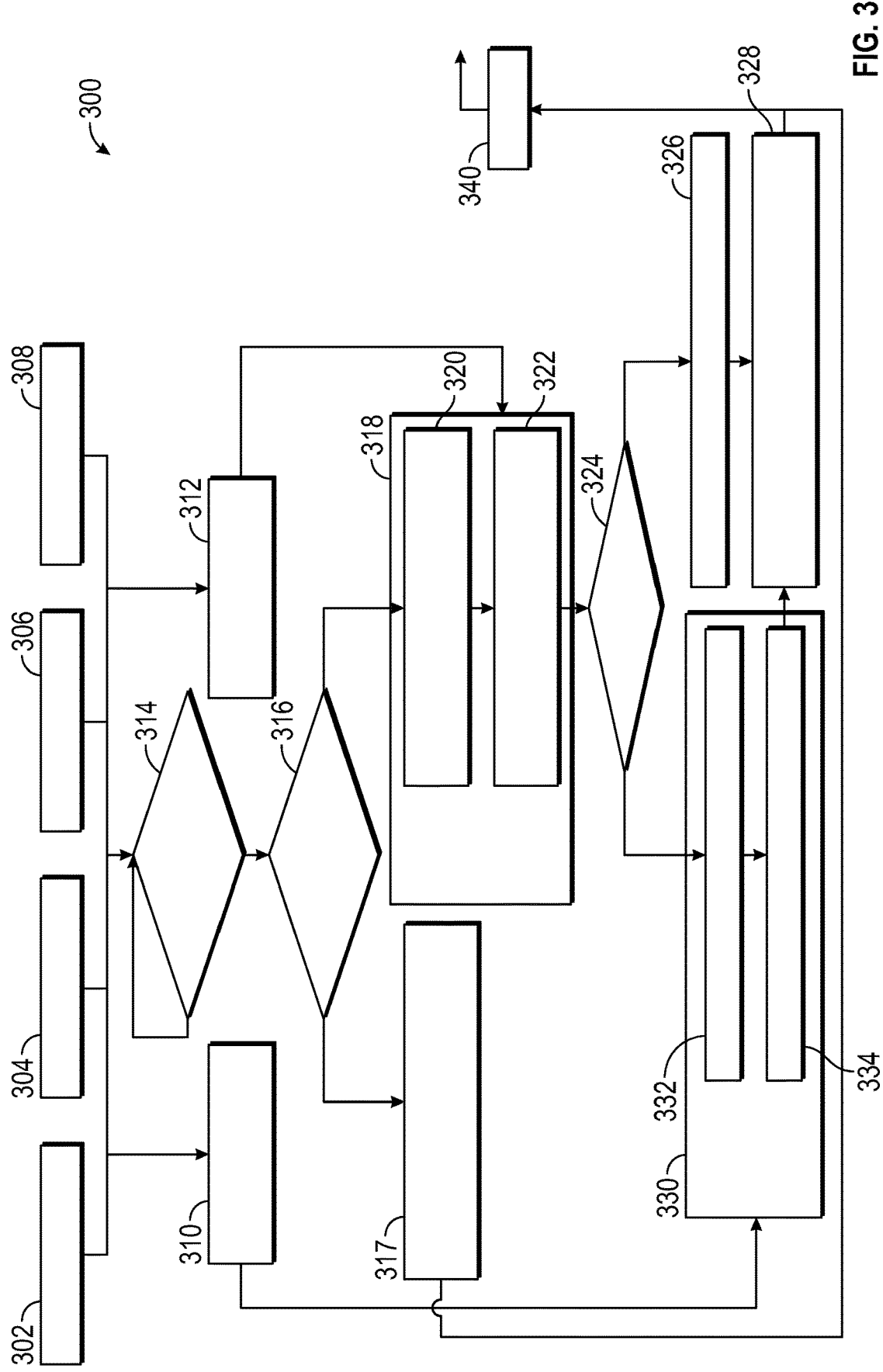
FIG. 3 shows a system flow diagram operable on the processor of a Level 4 or Level 5 automated vehicle in which general operation of the automated vehicle is described with respect to an ORU (other road user)

FIG. 3 shows a system flow diagram 300 operable on the processor 36 of a Level 4 or Level 5 AV 10 in which general operation of the AV is described with respect to an ORU. The system flow begins with receiving signals or data about the AV 10 and its surroundings and determined various states from the data. Such states can include, but are not limited to, a road state 302, an environmental state 304, an ORU state 306 and an AV state 308.

The road state 302 is based on road parameters such as the road geometry, presence of traffic signs or traffic lights as well as the state of the traffic lights, a number of lanes, right of way rules, etc. The environmental state 304 is based on environmental parameters such as the time of day (e.g., day, night), the state of the weather (e.g., rainy, sunny, overcast, etc.), lighting and visibility of the ORUs, road traction, braking distance, etc. The ORU state 306 is based on ORU parameters such as a position of the ORU or location of the ORU with respect to the AV, curb, crossing or other road landmark, a level of attentiveness of the ORU, a walking pace or velocity of the ORU, a communicated intent of the ORU, etc. The ORU parameters can also include a gender, an age level or disability of the ORU, a group size (for multiple ORUs crossing together) as well as various culturally acceptable right of way rules. The AV state 308 is based on dynamic parameters of the AV 10 such as a control action of the AV 10, a location and/or orientation of the AV 10, a current speed of the AV 10, a current acceleration of the AV 10, etc.

The processor 36 then performs an assessment of an objective need of the ORU (box 312) as well as subjective needs of the ORU (box 310) based on the road state 302, environmental state 304, ORU state 306 and AV state 308. An objective need of the ORU is a need that is communicated to the AV 10 based on a general class of the ORU (such as an age or disability of the ORU, whether the ORU is a traffic controller, a child on a scooter, etc.). A subjective need of the ORU is a need that is communicated to the AV 10 by explicit actions of the ORU, such as by a hand gesture, and by implicit actions of the ORU, such as a walking pace of the ORU, subtle movements of the ORU and facial expression of the ORU.

At box 314, the processor 36 monitors whether the AV 10 is moving and whether a ORU can be identified. If an ORU has not been identified, the processor 36 loops back to its monitoring state. Once an ORU has been identified however, the method proceeds to box 316 in which the processor 36 determines whether the AV 10 can stop safely with respect to the ORU, given the context (i.e., based on the road state 302, environmental state 304, ORU state 306, AV state 308, etc.)

If, at box 316, the AV 10 cannot stop, then the method proceeds to box 317 in which the vehicle communicates an emergency signal to the ORU. Once the emergency signal has been communicated, the method jumps to box 340 in which a library is updated in order to provide a historical record of the interaction, including relevant states, actions and communications taken and outcomes of the interaction.

If, at box 316, the AV 10 is able to stop, then the method proceeds to box 318 where the objective needs of the ORU (determined in box 312) are addressed. Box 318 includes box 320 in which the AV 10 initializes a communication protocol for interacting with the ORU and box 322 in which the AV 10 estimates a danger state. The danger state is a value based on ORU state 306 and AV state 308. Once the value of the danger state has been determined, the value is compared to a danger state threshold in box 324.

If, at box 324, the value of the danger state is greater than the danger state threshold, then the method proceeds to box 326 in which the AV 10 communicates a warning to the ORU. In box 328, the AV 10 finalizes a protocol of the interaction and resumes driving. From box 328, the method proceeds to box 340 to update the library.

Returning to box 324, if the value of the danger signal is equal to or less than the danger signal threshold, the method proceeds to box 330, in which the subjective needs of the ORU are addressed. Box 330 includes boxes 332 and 334. At box 332, the activity of the ORU is classified based on the subjective needs of the ORU. In box 334, the AV 10 implements a protocol corresponding to the activity of the ORU. Once the protocol has been implemented, the method proceeds to box 340 and the library is updated.

Table 1 shows a selection of various actions that can be taken by the AV 10 and their intended messages for a Level 4 or Level 5 automated vehicle.

TABLE 1

| Action | Meaning of interactive action |
| --- | --- |
| a | AV driving mode |
| b | "I see you." |
| c | "I intend to stop." |
| d | "I am decelerating." |
| e | "I cannot stop." (WARNING) |
| f1, f2 | "Stopping & I have stopped and will wait for you." |
| g | "I'm giving you the right of way." (follow this with a 'Thank you' gesture) |
| h | "I'm respecting your space and will not act against you" |
| i | "I'm also looking around for you by being attentive to the surroundings and other vehicles that may infringe on your space." |
| j | "I am warning you." (if required) |
| k | "I am leaving." (intent to drive when all pedestrians have completed their crossing or in a starvation mode) |
| l | "I am accelerating." |

Each action (a, b, c, d, e, f, g, h, i, j, k, l) can be determined based on the various states (e.g., road state 302, environmental state 304, ORU state 306, AV state 308) shown in FIG. 3. The corresponding messages communicate a message to indicate an intended action of the AV. Thus, when the AV is decelerating (action 'd'), the message "I am decelerating" can be displayed to the ORU.

Figure 4:
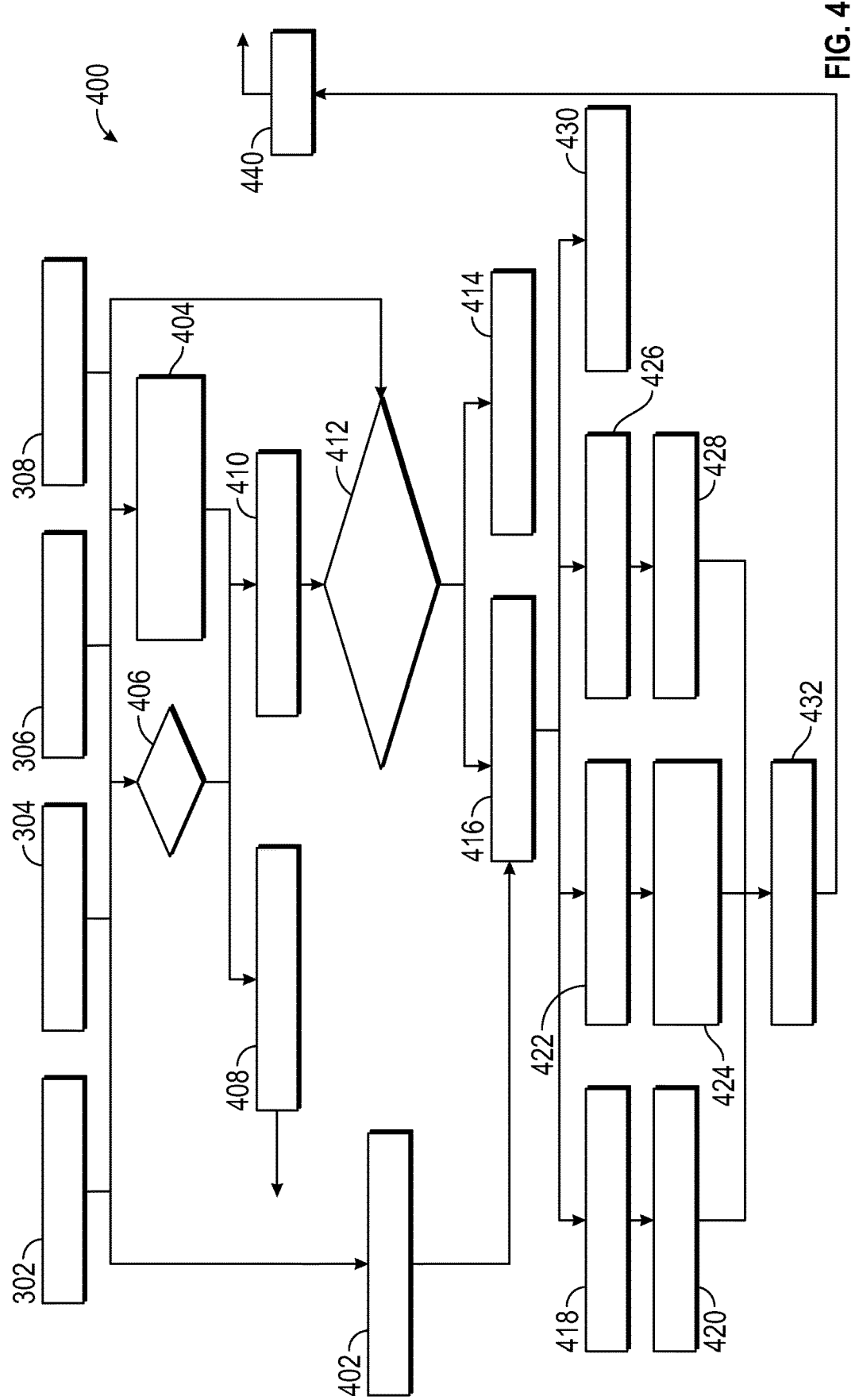
FIG. 4 shows an example of the system flow of FIG. 3 for an illustrative scenario in which the ORU is a pregnant lady crossing a road section in front of the path of a Level 4 or Level 5 automated vehicle.

FIG. 4 shows an example of the system flow 400 of FIG. 2 for an illustrative scenario in which the ORU is a pregnant lady crossing a road section in front of the path of a Level 4 or Level 5 AV 10. The system flow 400 begins with determining a road state 302, environmental state 304, ORU state 306 and AV state 308 from received signals. In this scenario the ORU state 306 includes that the ORU is a pregnant lady. In box 404, the objective needs of the ORU are assessed based on the ORU being a pregnant lady. In box 402, the subjective needs of the ORU are assessed based on the ORU being a pregnant lady.

In box 406, the AV 10 determines, upon recognition of the ORU, whether the AV 10 can stop in time. If the AV 10 cannot stop in time, the method proceeds to box 408 in which the AV communicates a warning to the ORU of "I cannot stop". The system flow 400 then proceeds to update the library at box 440. If, in box 406, the AV 10 is able to stop, then the system flow proceeds to box 410 in which any of the actions a, b, c, d and f from Table 1 can be acted upon. The action that is acted upon is based on the explicit needs of the ORU.

In box 412, a value indicative of a danger state is determined and compared to danger state threshold. The value of the danger state is determined based, in part, on the needs of a pregnant lady with an intention to cross the road, etc. If the value of the danger state is above the threshold, then the method proceeds to box 414 in which the action 'j' is taken ("I am warning you."). Returning to box 412, if the value of the danger state is equal to or less than the danger state threshold, then the method proceeds to box 416. In box 416, the ORU behavior is classified based on subjective needs, such as the subjective needs for a pregnant lady (box 402). If the ORU behavior is a "Thank you" gesture (box 418), the processor 44 can implement action 'g' ("I'm giving you the right of way.") (box 420).

If the ORU behavior is a guiding gesture (box 422), the method can implement action 'g' ("I'm giving you the right of way.") and add blinkers if is it considered necessary to express the intent of the AV (box 424). If the ORU behavior is an indication of uncertainty (box 426), the AV can implement actions 'h' ("I'm respecting your space and will not act against you") and 'i' ("I'm also looking around for you by being attentive to the surroundings and other vehicles that may infringe on your space.") (box 428). Upon completion of any of boxes 420, 424 and 428, the method can proceed to box 432 in which actions 'k' ("I am leaving.") and 'l' ("I am accelerating.") can be taken. The method can then proceed to box 440 to update the library. At box 430, other possible ORU behaviors can be considered.

Figure 5:
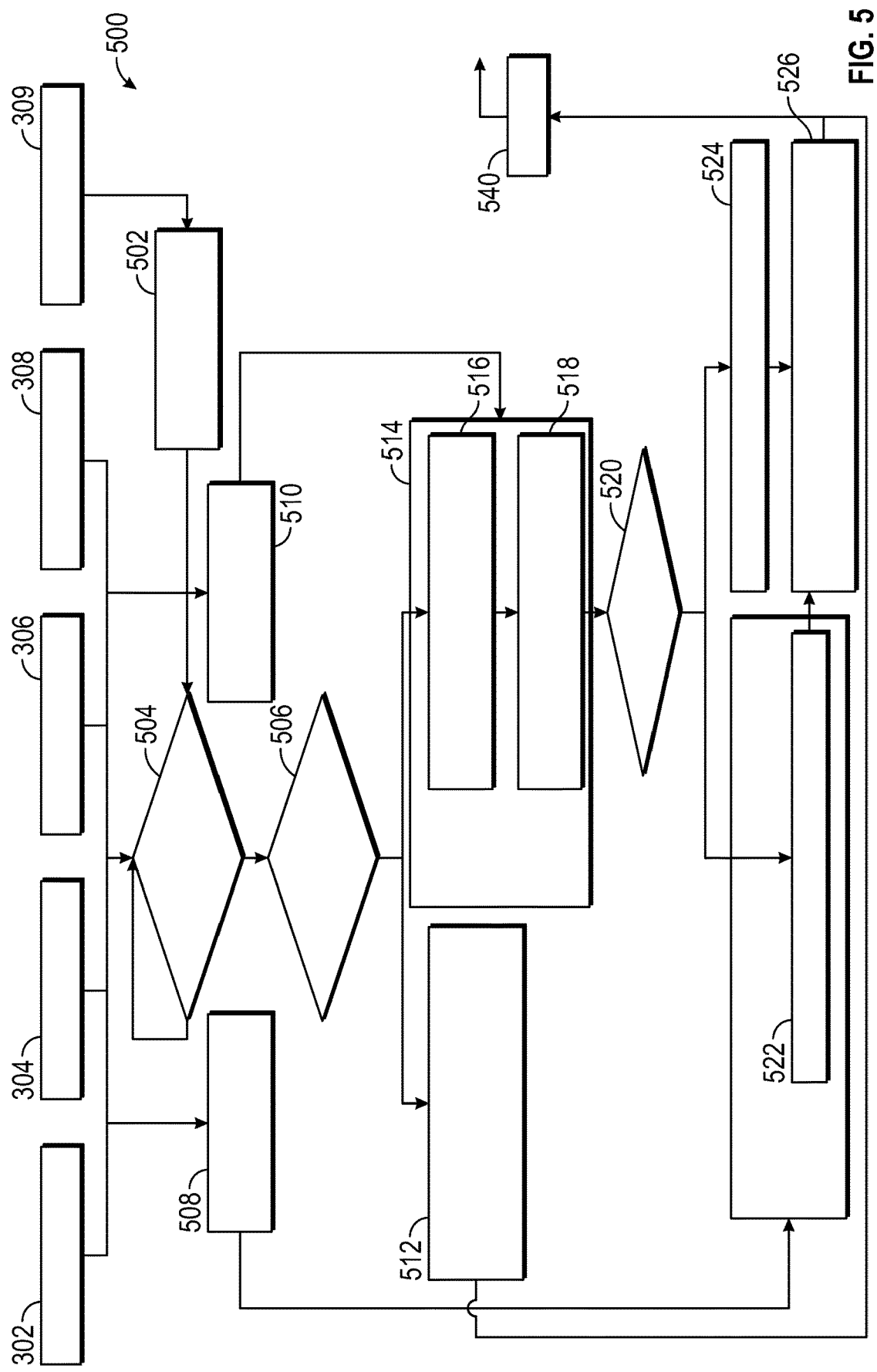
FIG. 5 shows a system flow diagram operable on the processor of a Level 2 or Level 3 automated vehicle in which general operation of the automated vehicle is described with respect to an ORU.

FIG. 5 shows a system flow diagram 500 operable on the processor 36 of a Level 2 or Level 3 AV 10 in which general operation of the AV is described with respect to an ORU. The system flow begins with receiving signals or data about the AV 10 and its surroundings and determined various states from the data. Such states can include, but are not limited to, a road state 302, an environmental state 304, an ORU state 306, an AV state 308 and a driver state 309. The road state 302, environmental state 304, ORU state 306 and AV state 308 are the same as discussed above with respect to FIG. 3 The driver state 309 is based on, for example, a command from the driver or a state of the driver, such as a level of awareness of the driver, etc. At box 502, the processor 36 can assess a driver's intended or actual actions based on the driver state 309. The assessment of the driver's intended or actual actions can be used when monitoring the AV 10 with respect to ORUs.

The processor 36 performs an assessment of an objective need of the ORU (box 510) as well as subjective needs of the ORU (box 508) based on the road state 302, environmental state 304, ORU state and AV state 308. At box 504, the processor 36 monitors whether the AV 10 is moving and whether an ORU can be identified. If an ORU has not been identified, the processor 36 loops back to its monitoring state. Once an ORU has been identified however, the method proceeds to box 506 in which the processor 36 determines whether the AV 10 can stop safely with respect to the ORU, given the context (i.e., based on the road state 302, environmental state 304, ORU state 306, AV state 308, driver state 309, etc.)

If, at box 506 the AV 10 cannot stop, then the method proceeds to box 512 in which the vehicle communicates an emergency signal to the ORU. Once the emergency signal has been communicated, the method jumps to box 540 in which a library is updated in order to provide a historical record of the interaction, including relevant states, actions and communications taken and outcomes of the interaction.

If, at box 506, the AV 10 is able to stop, then the method proceeds to box 514 where the objective needs of the ORU (determined in box 510) are addressed. Box 514 includes box 516 in which the AV 10 initializes a communication protocol for interacting with the ORU and box 518 in which the AV 10 estimates a danger state. The danger state is a value based on ORU state 306 and AV state 308. Once the value of the danger state has been determined, the value is compared to a danger state threshold in box 520.

If, at box 520, the value of the danger state is greater than the danger state threshold, then the method proceeds to box 524 in which the AV 10 communicates a warning to the ORU. In box 526, the AV 10 finalizes a protocol of the interaction and resumes driving. From box 526, the method proceeds to box 540 to update the library.

Returning to box 520, if the value of the danger signal is equal to or less than the danger signal threshold, the method proceeds to box 522 to address subjective needs of the ORU. Box 522 includes implementing a communication protocol to the ORU based on the activity of the ORU. Once the communication protocol has been completed, the method proceeds to box 526 in which the protocol is completed and the vehicle resumes driving. The method then proceeds to box 540 to update the library.

Table 2 shows a selection of various actions that can be taken by the Level 2 or Level 3 AV 10 and their intended messages.

TABLE 2

| Action | Meaning of interactive action |
| --- | --- |
| d | "I am decelerating." |
| e | "I cannot stop." (WARNING) |
| f 1 | "I am stopping" |
| k | "I am leaving." (intent to drive when all pedestrians have completed their crossing or in a starvation mode) |
| l | "I am accelerating." |

Each action (d, e, f1, k, l) can be determined based on the various states (e.g., road state 302, environmental state 304, ORU state 306, AV state 308, driver state 309) shown in FIG. 3. The corresponding messages communicate a message to indicate an intended action of the AV. Thus, when the AV is decelerating (action 'd'), the message "I am decelerating" can be displayed to the ORU. It is clear from a comparison of Tables 1 and 2 that the Table 2 is an abridged version of Table 1. Level 4 and Level 5 vehicles can use all of the communication messages in Table 1, while Level 2 and Level 3 vehicles do not use the communication messages of a, b, c, f, g, h, i and j.

Figure 6:
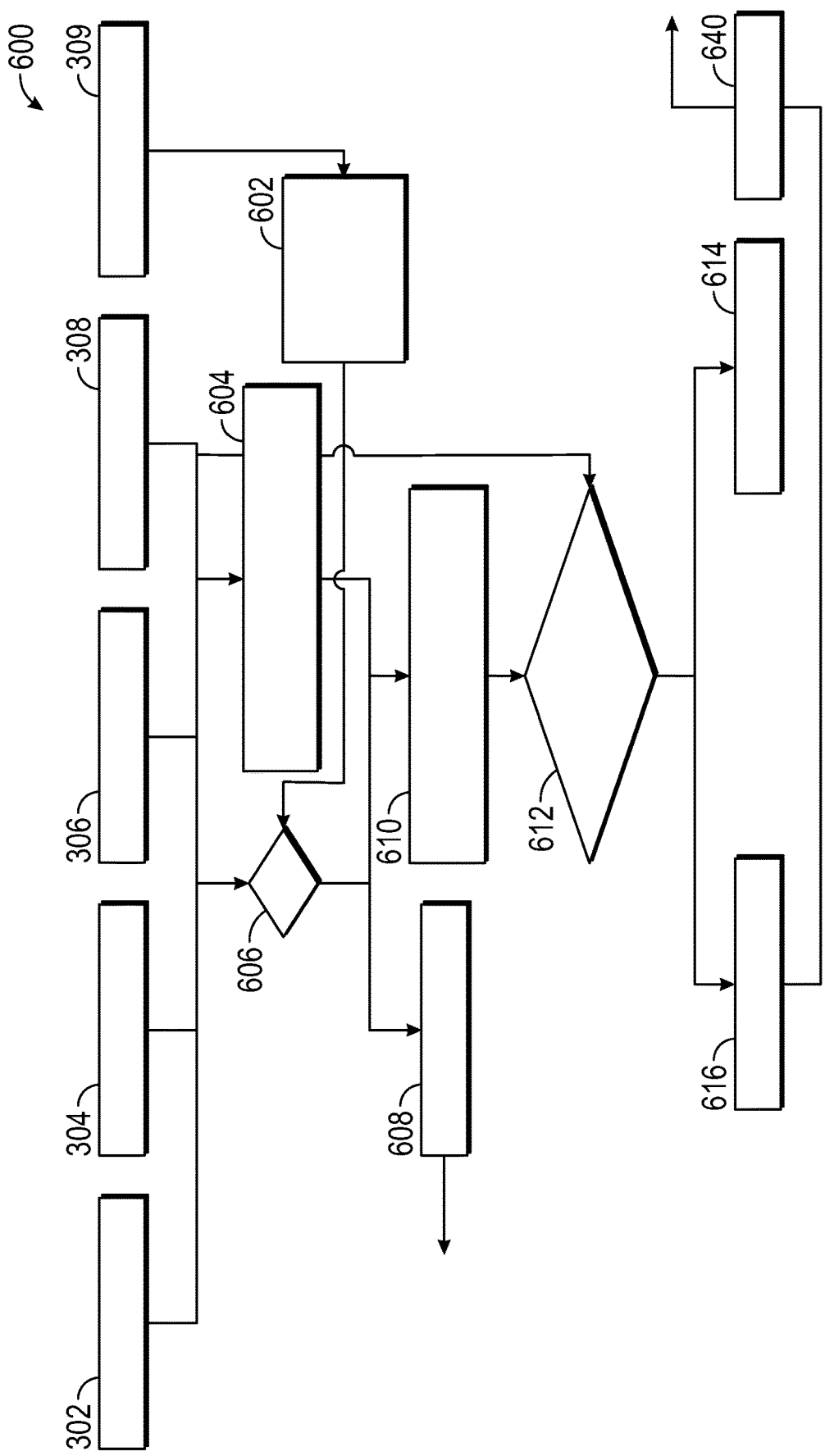
FIG. 6 shows an example of the system flow of FIG. 5 for an illustrative scenario in which the ORU is a pregnant lady crossing a road section in front of the path of a Level 2 or Level 3 automated vehicle.

FIG. 6 shows an example of the system flow 600 of FIG. 5 for an illustrative scenario in which the ORU is a pregnant lady crossing a road section in front of the path of a Level 2 or Level 3 AV 10. The system flow 600 begins with determining a road state 302, environmental state 304, ORU state 306 and AV state 308 from received signals. In this scenario the ORU state 306 includes that the ORU is a pregnant lady. In box 602, the processor 36 can assess a driver's intended or actual actions based on the driver state 309. The assessment of the driver's intended or actual actions can be used when monitoring the AV 10 with respect to ORUs.

In box 604, the objective needs of the ORU are assessed based on the ORU being a pregnant lady. In box 606, the processor 36 monitors whether the AV 10 is moving and whether an ORU can be identified. If an ORU is identified, the processor 36 determines if the AV 10 can stop in time. If the AV 10 cannot stop in time, the method proceeds to box 608 in which the AV communicates a warning to the ORU of "I cannot stop". The system flow 600 then proceeds to update the library at box 640. If, in box 606, the AV 10 is able to stop, then the system flow proceeds to box 610 in which any of the actions, d and fl from Table 1 can be acted upon. The action that is acted upon in box 610 is based on the explicit and implicit needs of the ORU identified in box 604.

In box 612, a value of a danger state is determined and compared to a danger state threshold. The value of the danger state is determined based, in part, on the needs of a pregnant lady with an intention to cross the road, etc. If the value of the danger state is above the threshold, then the method proceeds to box 614 in which the action 'j' is taken ("I am warning you."). Returning to box 612, if the value of the danger state is equal to or less than the danger state threshold, then the method proceeds to box 616. In box 616, at least one of actions 'k' ("I am leaving.") and 'l' ("I am accelerating.") can be taken. The method can then proceed to box 640 to update the library.

In various embodiments, the processor 36 employs a map or mapping application to locate crossing lanes within a roadway. The AV 10 activates the communication protocol when approaches a crossing lane. The map can also be used to distinguish between an ORU that is properly using the crossing lane and an ORU that is jaywalking at a location away from a crossing lane. A communication protocol can be activated when the AV 10 approaches a legal crossing lane or a crossing lane indicates on the map.

Figure 7:
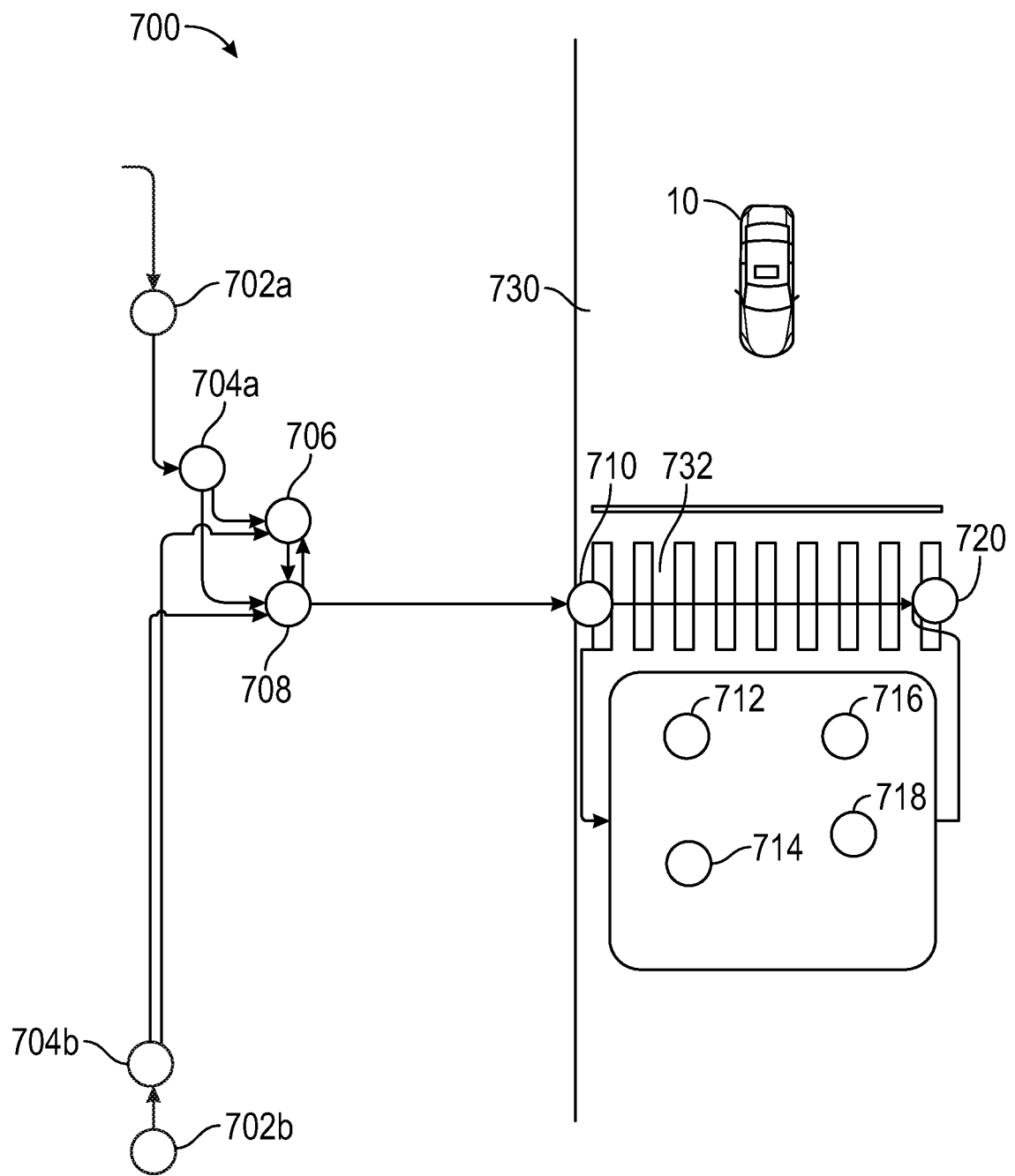
FIG. 7 shows a spatially arranged state diagram illustrating a default set of behavior states of an ORU at different locations with respect to the automated vehicle.

FIG. 7 shows a spatially arranged state diagram 700 illustrating a default set of behavior states of a ORU at different locations with respect to the AV 10 and a default set of messages that are expected to be communicated by the ORU, in an embodiment. The AV 10 is shown traveling in a road section 730 and approaching a lane crossing 732. The states of the ORU includes states that occur when the ORU is alongside the road section (such as on a sidewalk) or approaching the lane crossing 732, as well as states when the ORU is in the lane crossing 732 and when the ORU is leaving the lane crossing 732.

In ORU behavior state 702a, the ORU is walking alongside the road section 730 proceeding in the same direction as the AV 10. Upon reaching the lane crossing 732, the ORU can enter a ORU behavior state 704*a* by glancing around to look for the AV 10. The AV 10 can determine from the ORU's behavior and/or gestures (i.e., either by eye contact, a head turning gesture, etc.) that the ORU is communicating "I can see you." Alternately, another pedestrian in ORU behavior state 702*b* can be walking alongside the road in the opposite direction as the AV 10. As this alternate pedestrian is walking in the opposite direction as the AV 10, he can acknowledge the presence of the AV 10 before reaching the lane crossing 732, as indicated by ORU behavior state 704*b*. Upon reaching the lane crossing 732, the pedestrian can enter either an ORU behavior state 706 for holding, indicating "I'm not crossing" or an ORU behavior state 708 that indicates "I'm about to cross." Once the intent-to-cross of the ORU behavior state 708 has been communicated, the pedestrian can move to the curb, indicating an ORU behavior state 710 to communicate "I am starting cross". While crossing the road, the pedestrian can indicate several states, such as ORU behavior state 712 ("Thank you for holding."), ORU behavior state 714 (a "Hold back" gesture), ORU behavior state 716 ("I am slow.") and ORU behavior state 718 ("Don't drive over me."). Once the pedestrian reaches the other side of the road, he can enter an ORU behavior state 720 to sign-off from the interaction with the AV 10.

Figure 8:
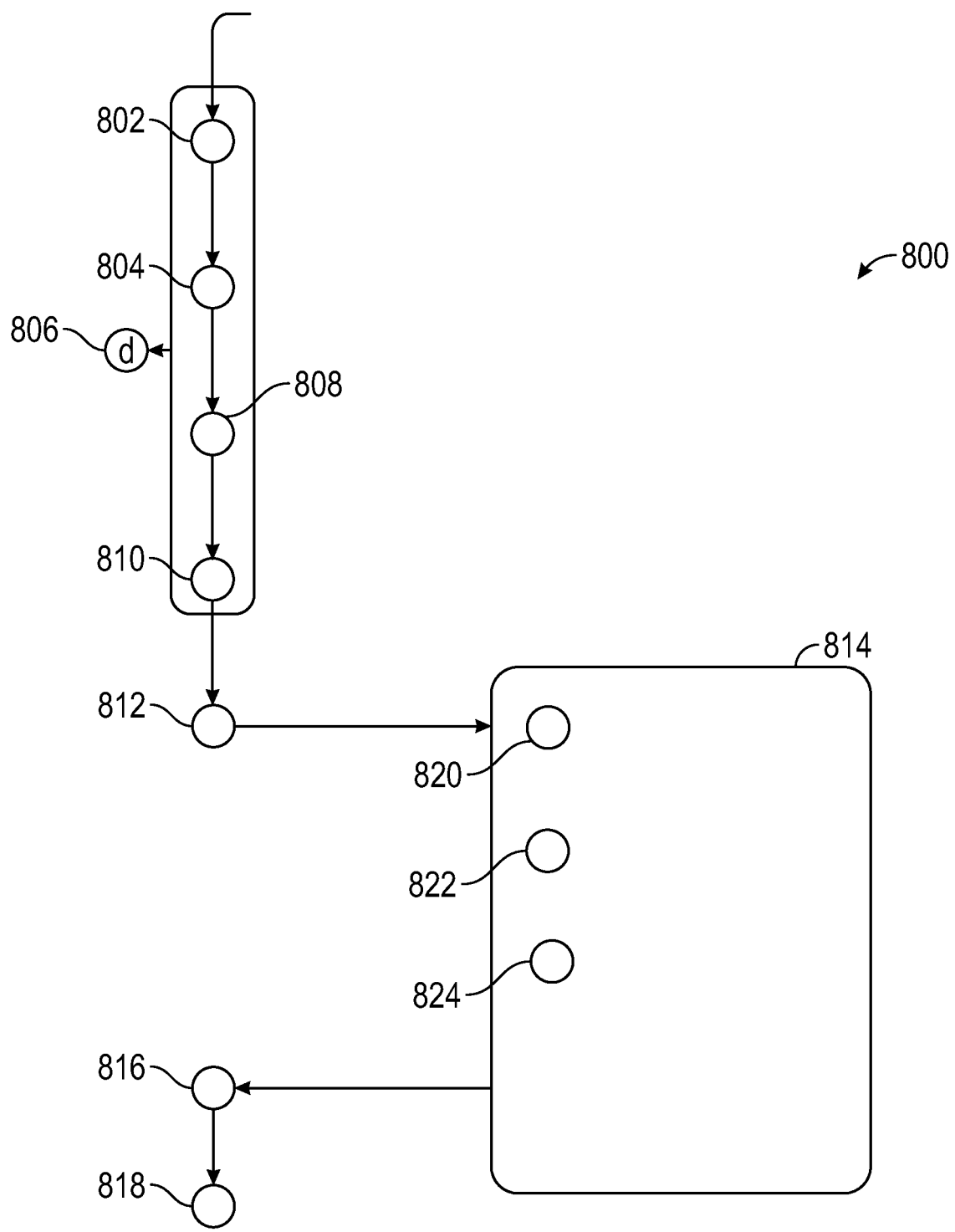
FIG. 8 shows an automated vehicle behavior state diagram and communications that corresponds to the ORU behavior states shown in FIG. 7.

FIG. 8 shows an AV behavior state diagram 800 and communications that corresponds to the ORU behavior states shown in FIG. 7. The AV behavior states are those shown those shown in Table 1. The AV behavior state 802 is a driving state and can correspond to the ORU behavior states 702*a* and 702*b* in which the pedestrian is walking. AV behavior state 804 ("I see you.") corresponds to ORU behavior states 704*a* and 704*b* ("I see you."). AV behavior state 806 ("I am not stopping for you.") corresponds to ORU behavior state 706 ("I'm not crossing"). When a situation is dangerous, the AV behavior state 806 can indicate an alert or warning being communicated to the ORU. However, if no conflict is expected at AV behavior state 806 (for example, if the ORU is not planning to cross (i.e., ORU behavior state 706), then the car can communicate its intention to continue to drive by using non-threatening communication (e.g., by playing a 'revving the engine' replacement sound).

AV behavior state 808 ("OK, I'm intending to stop (for you)" corresponds to ORU behavior state 708 ("I'm about to cross.") AV behavior state 810 ("I am slowing down (and stopping for you)") corresponds to ORU behavior state 710 ("I am on the pavement and starting to cross.") AV behavior state 812 ("I have stopped for you.") corresponds to a normal crossing act which may be characterized by glance by the ORU to the AV 10 (as the ORU moving from ORU behavior state 710 to ORU behavior state 720), or any of ORU behavior state 712 ("Thank you for holding."), ORU behavior state 714 (a "Hold back" gesture), ORU behavior state 716 ("I am slow.") and ORU behavior state 718 ("Don't drive over me."). AV behavior state 818 ("I am leaving") corresponds to ORU behavior state 720 ("Bye.").

Additional AV behavior states 814 can be communicated to the pedestrian while the pedestrian is in the middle of crossing. These AV behavior states 814 can include, but are not limited to, AV behavior state 820 ("I am giving you the right of way."), AV behavior state 822 ("I am respecting your space and will not act against you."), and AV behavior state 824 ("I'm also looking around for you by being attentive to the surroundings and other vehicles that may infringe on your space.").

Figure 9:
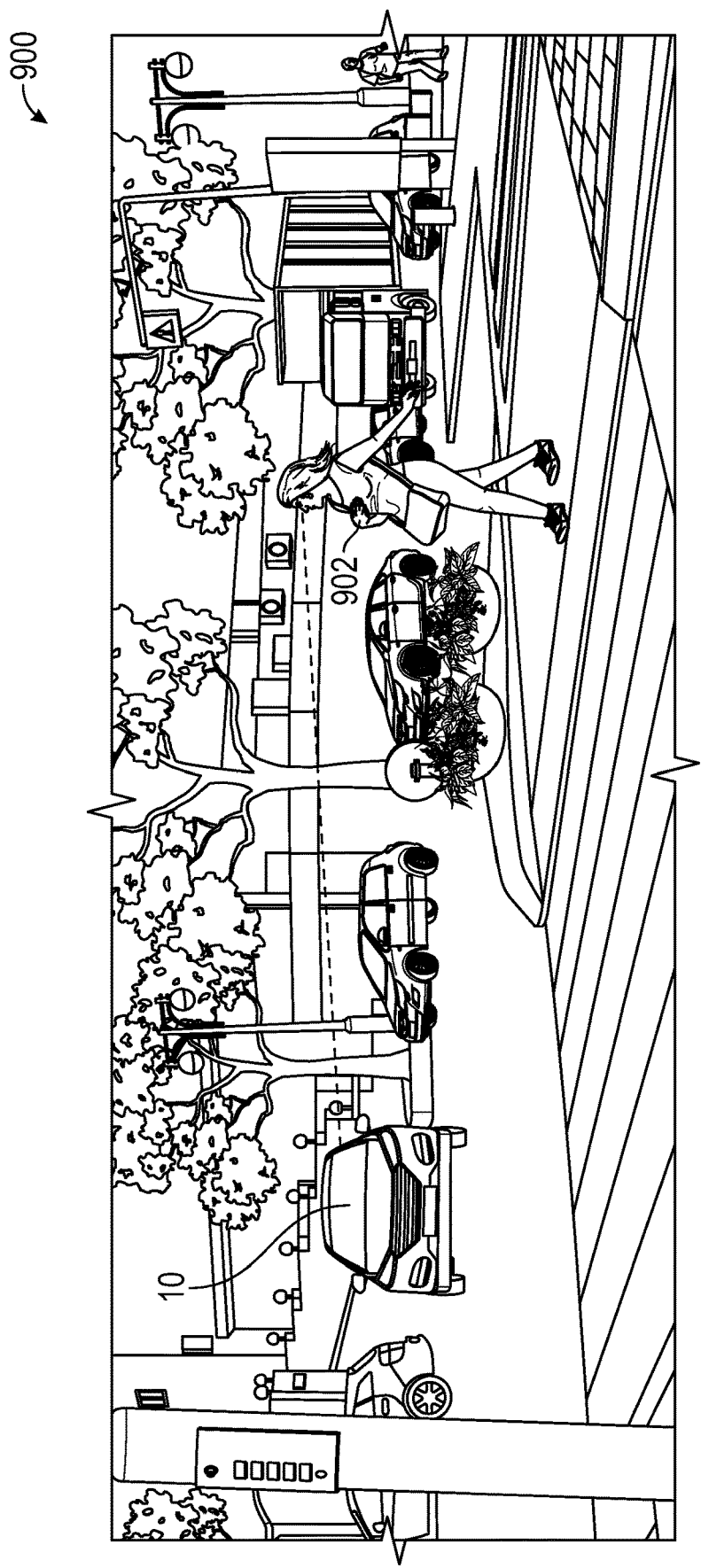
FIG. 9 illustrates an ORU or pedestrian giving a glance along a road just before starting to cross the road.

FIGS. 9-15 show various behaviors to be expected from an ORU in its interaction with an AV 10. FIG. 9 show a default behavior associated with an ORU approaching to cross a road. ORU 902 turns her head upon reaching the curb and looks in the direction of traffic in order to see if an AV 10 is coming toward her.

Figure 10:
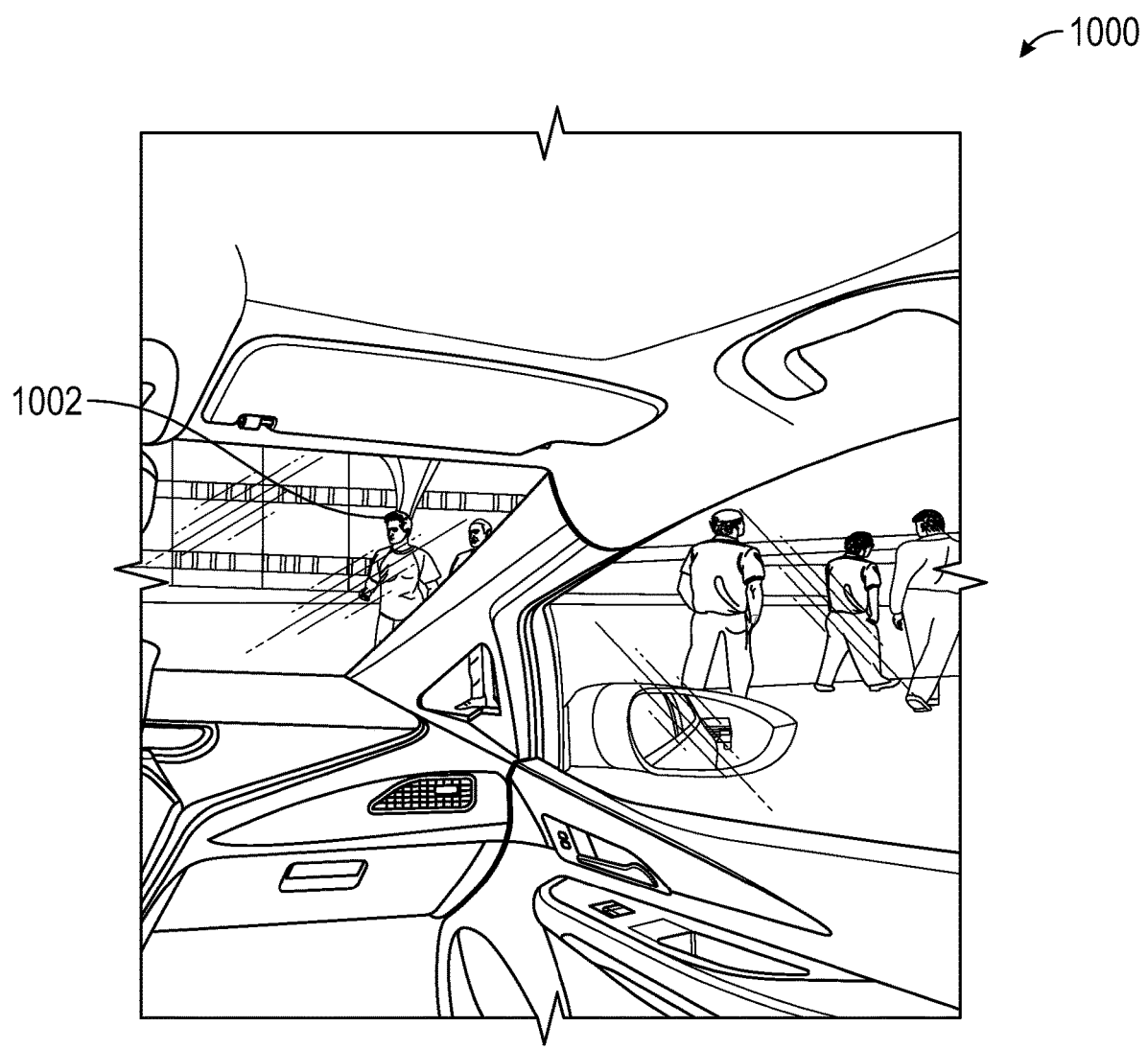
FIG. 10 illustrates a scenario including a pedestrian whose body language indicates that the pedestrian does not intend to cross the road.

FIG. 10 illustrates a scenario 1000 including a pedestrian 1002 whose body language indicates that the pedestrian does not intend to cross the road (ORU behavior state 706). The pedestrian has indicated his intention by stopping at the curb and remaining still. The AV 10 can signal either that it is slowing down (AV behavior state 808) and stopping (AV behavior state 810), and then, that it plans to speed up and in order to leave the area (AV behavior state 816) or that it is not planning to stop (AV behavior state 806).

Figure 11:
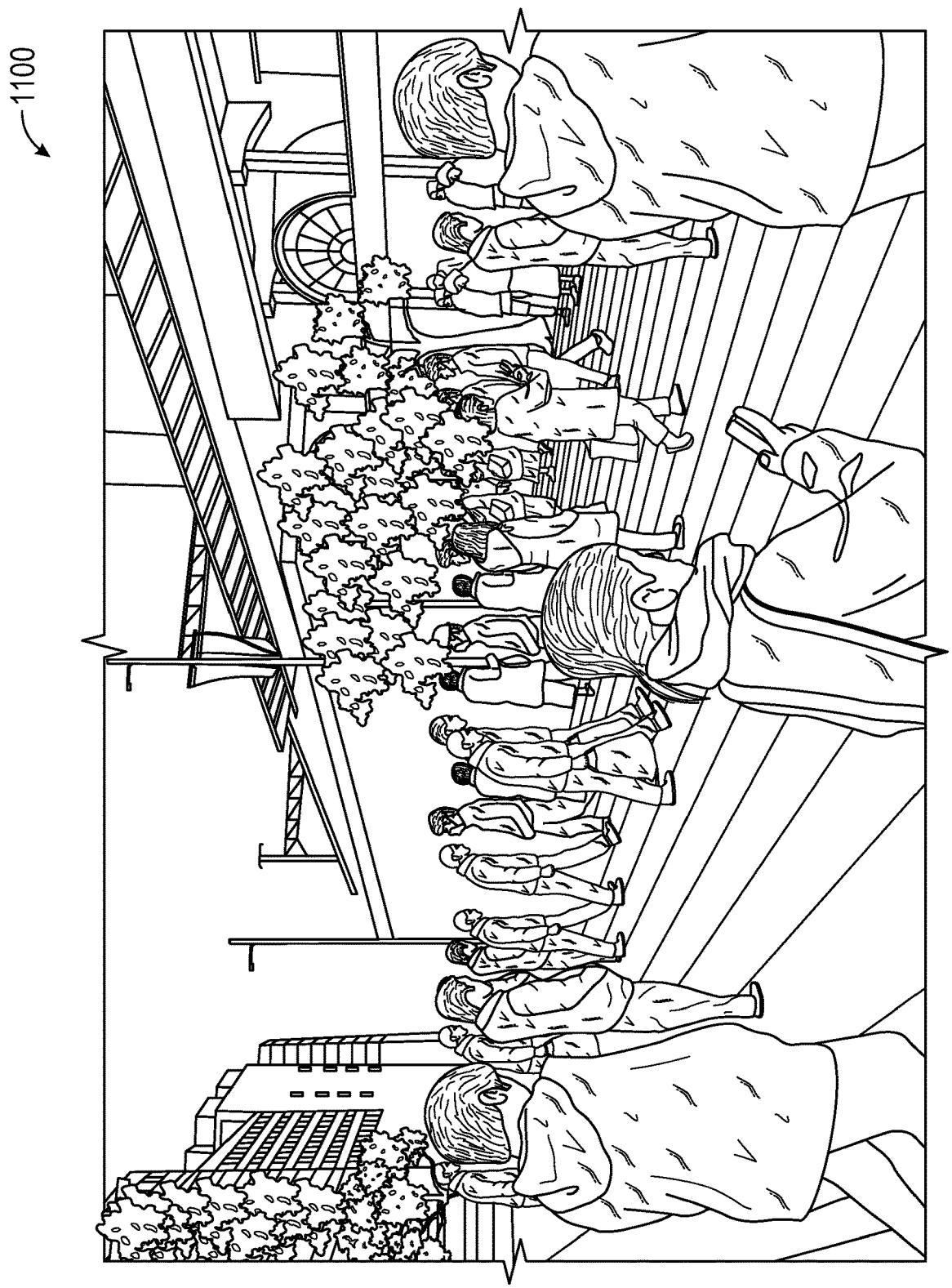
FIG. 11 illustrates a scenario for a starvation situation for the automated vehicle.

FIG. 11 illustrates a scenario 1100 for a starvation situation for the AV 10, such as a rush hour situation at a city block, in which the number of pedestrians and pedestrian behaviors is overwhelming to the AV system. At some point, the AV 10 may choose to signal its intent to cross (AV behavior 816).

Figure 12:
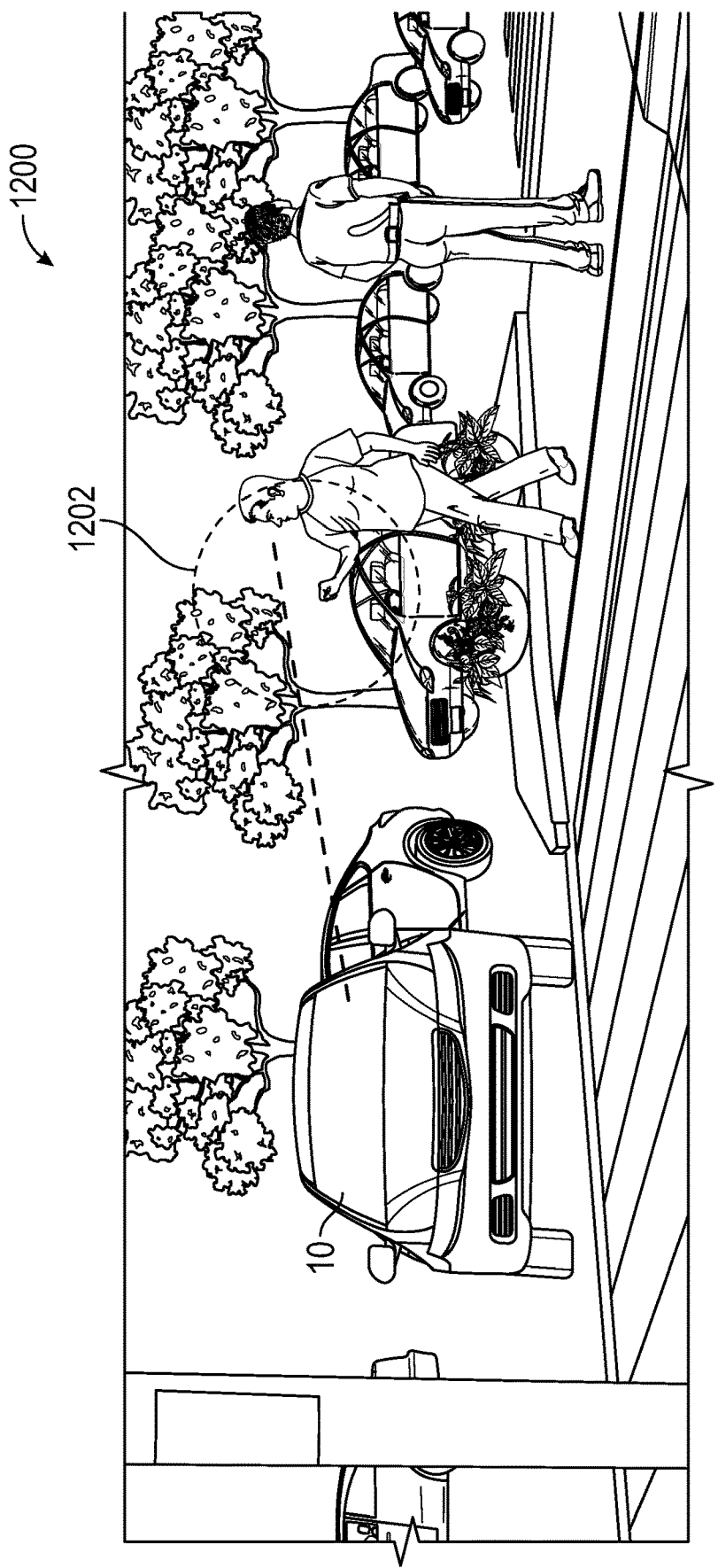
FIG. 12 illustrates a scenario including a "Thank you" gesture from a pedestrian crossing the road.

FIG. 12 illustrates a scenario 1200 including a "Thank you" gesture 1202 from a pedestrian crossing the road. The pedestrian looks at the AV 10 to make eye contact and makes "Thank you" gesture by waving his hand as he starts to cross (ORU behavior state 710). The AV 10 signals back stating that it is giving the ORU the right of way (AV behavior state 820), thereby acknowledging the gesture from the pedestrian.

Figure 13:
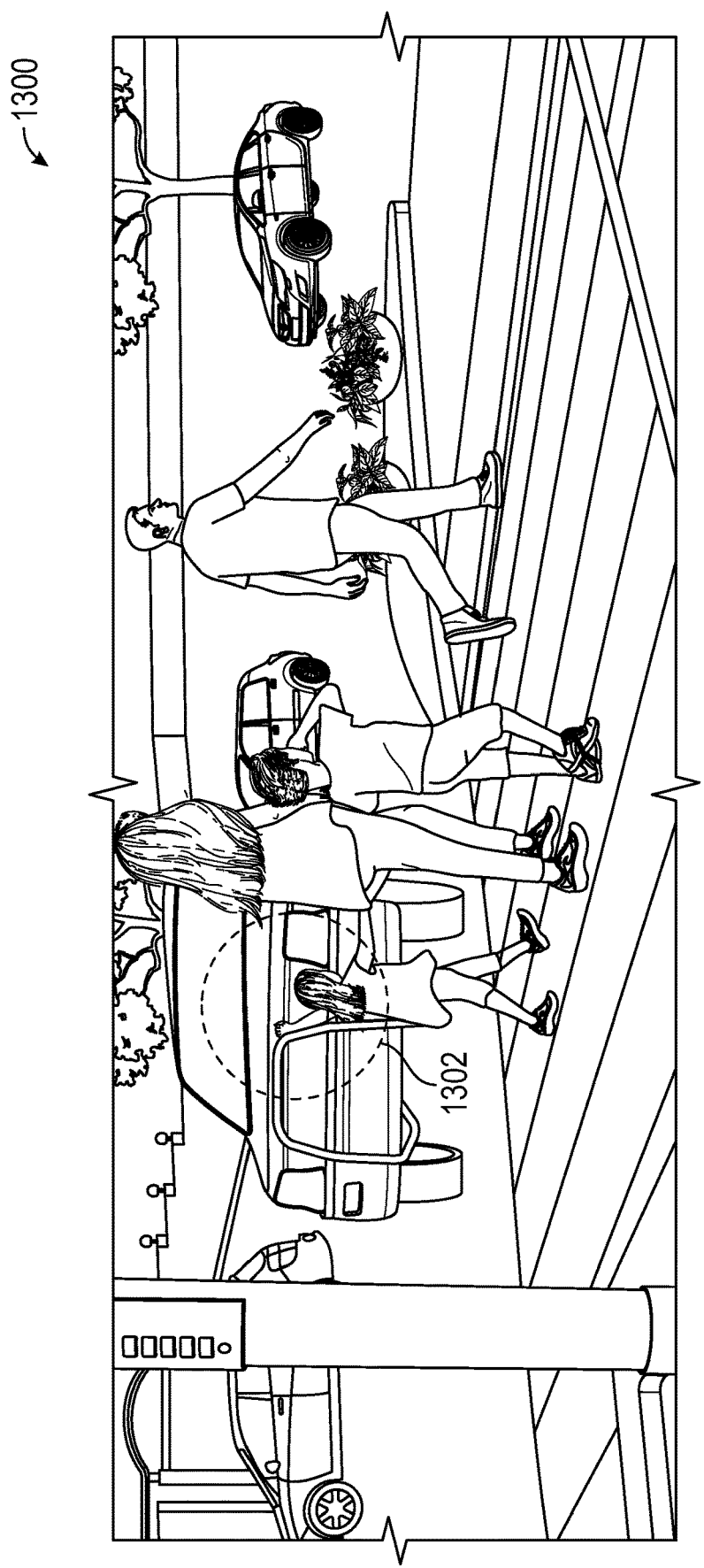
FIG. 13 illustrates a scenario in which the pedestrian wishes to cross in front of the automated vehicle.

FIG. 13 illustrates a scenario 1300 in which the pedestrian wishes to cross in front of the AV 10. The pedestrian starts crossing the road, claiming the space with an "I'm here" gesture 1302 (ORU behavior state 716). The AV 10 can signal back to the pedestrian that it respects the pedestrian's space (AV behavior state 822).

Figure 14:
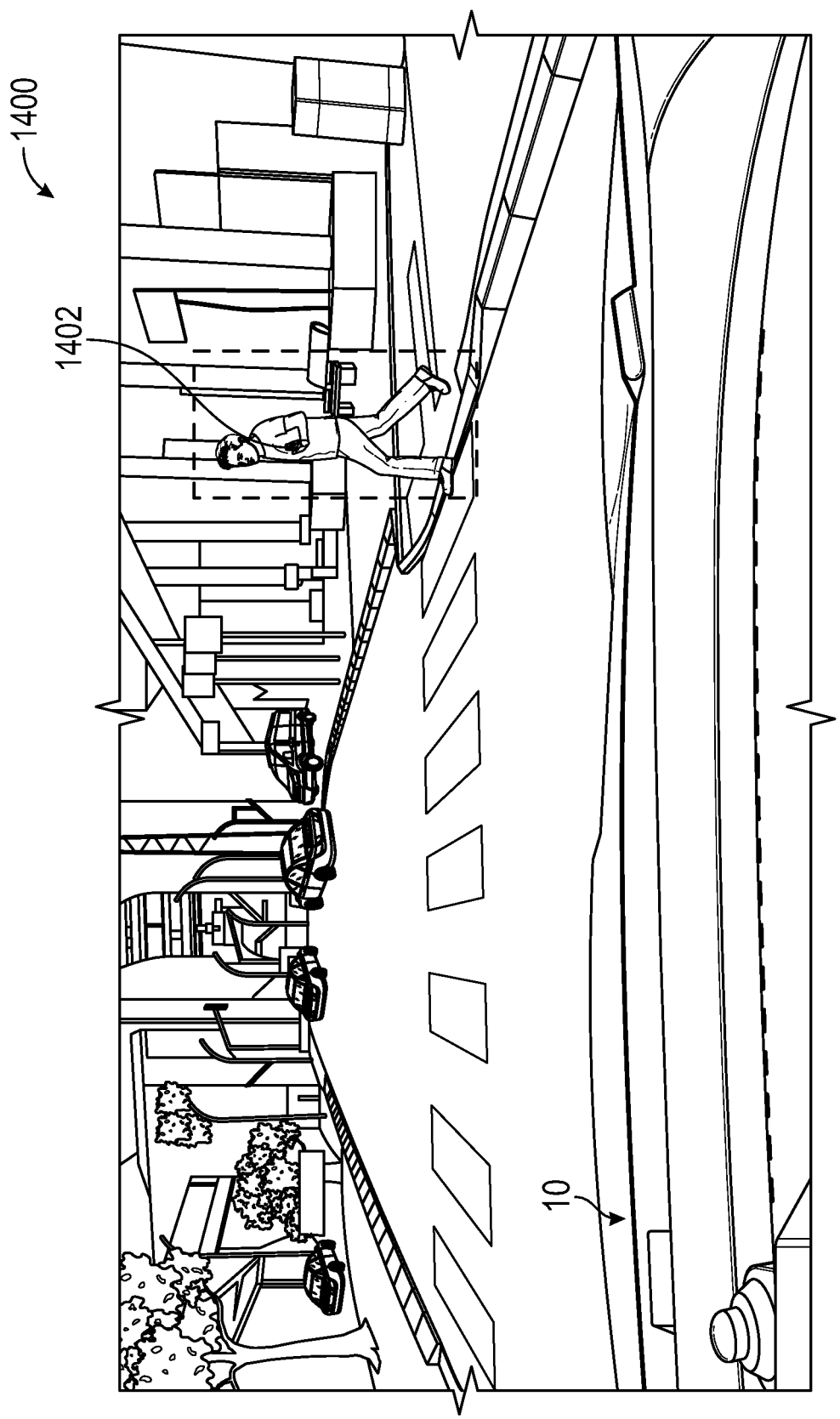
FIG. 14 illustrates a scenario in which a pedestrian aggressively claims the road.

FIG. 14 illustrates a scenario 1400 in which the pedestrian aggressively claims the road. The pedestrian starts crossing the road and makes an aggressive "Stop" or "Watch where you are going" gesture 1402 (ORU behavior state 714). The AV 10 can signal back to state that it is giving the ORU the right of way and that it respects the pedestrians space (AV behavior state 822).

Figure 15:
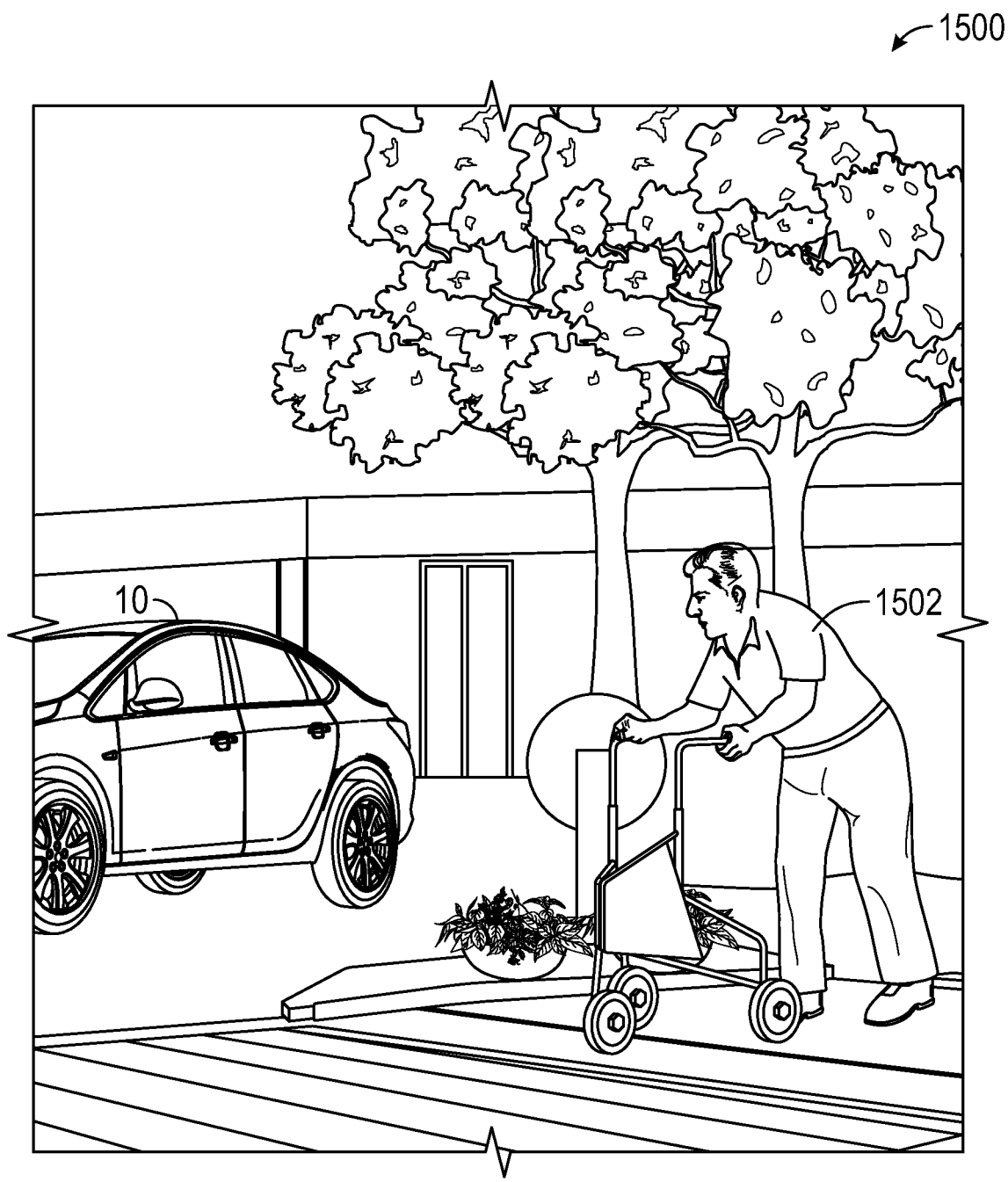
FIG. 15 shows a scenario in which a pedestrian is elderly or requires additional consideration.

FIG. 15 shows a scenario 1500 in which the pedestrian 1502 is elderly or requires additional consideration. The elderly man 1502 needs assistance in moving and is therefore slow in crossing (ORU behavior state 718). The AV 10 can send a signal to state that it will wait patiently (AV behavior state 822) and if possible that it is looking around for other vehicles that might infringe on its space (AV behavior state 824), thereby protecting the pedestrian.

In the illustrative scenarios of FIGS. 9-15, the AV 10 communicates with the ORU using a communication language that can be understood by the ORU. The communication language portrays an awareness of its surroundings, and an intention and behavior of the AV 10. The communication language can include a combination of visual and auditory content in order to communicate a message with the intention of not only getting the message to the ORU but also of eliciting a selected emotion within the ORU or response from the ORU.

The communication language uses a structured vocabulary. Certain shapes and animated content can be displayed on the panels to deliver a message to the ORU to meet the functional needs of the ORU. Specific visual features convey different element in the communication language.

Figure 16:
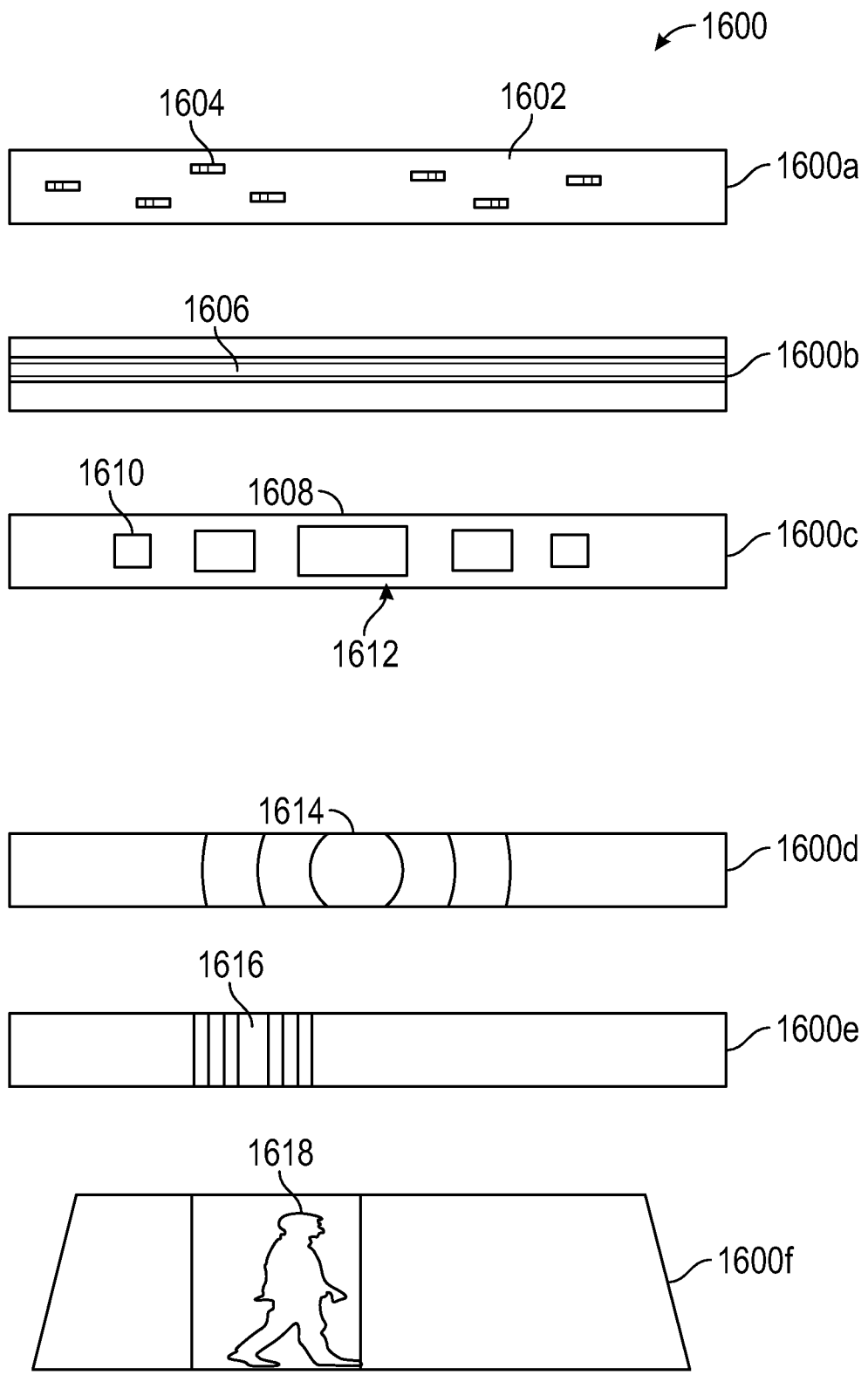
FIG. 16 shows an illustrative vocabulary of a visual communication language of the automated vehicle.

FIG. 16 shows an illustrative vocabulary 1600 of a visual communication language of the AV 10. The vocabulary employs certain symbols, shapes and motions in order convey an idea or deliver a message to the ORU. The symbols can be static or animated (i.e., changing shape and form with time). The symbols may pulsate gently to attract the user or flash harshly to deter the user, move up and down, converge and diverge, move from one side to the other, or remain in a fixed location. The vocabulary can employ different colors, light intensities, speeds, temporal and/or spatial waveforms (e.g., sinusoidal, triangular, rectangular), etc. in order to elicit different emotions from the ORU. For example, radial, abrupt, flash according to a temporally rectangular waveform can be used to express danger, while subtle glowing waveforms can be used to create engagement with the ORU. In various embodiments, the selection of shapes, colors, light intensities, speeds, temporal and/or spatial waveforms, etc. can be based on bioluminescence and the function of these characteristics in communication between animals in nature.

Panels 1600a-1600f show some illustrative symbolic messages of the visual communication language. The messages displayed on panels 1600a-1600f can be displayed on any of the panels 202, 205, 206, 208, 212, 214 and 216 of FIG. 2. Similar principles can be applied to communicate messages using a single LED string or at a windshield display, such as LED panel 205. Panel 1600a shows one or more particles 1604 displayed against a background region 1602 of the panel 1600a. A particle 1604 can be group of pixels that are lit to stands out from the background region 1602. The particles 1604 can be static or in motion. The intensity of particles 1604 can be changing according to a temporally sinusoidal pulsation. The appearance of particles 1604 at the panel 1600a expresses to the ORU a general awareness of the AV 10 of its surrounding environment while the AV is in motion in an autonomous mode. A sound designed to communicate the AV 10 being in an autonomous mode can accompany the presence of the particles.

Panel 1600b shows a horizontal line 1606 that indicates to the ORU an intention to stop based on an awareness of the ORU, etc. Panel 1600c shows a dashed line 1608 extending along a horizontal axis to indicate states of acceleration or deceleration/stopping act. The dashes 1610 of the dashed line can be either diverging from a selected point 1612 of the panel to indicated acceleration or converging on the selected point 1612 to indicate deceleration. Panel 1600d shows a radial light 1614 which can be made to be diverging from a selected point on the panel. This radial light 1614 can be used to express a warning to the ORU or to get the attention of the ORU.

Panel 1600e and panel 1600f show symbols that can be displayed to indicate that the AV is tracking the ORU. As shown in Panel 1600e, the symbol is an abstract symbol 1616 such as a vertical light or any other abstract representation that is displayed at the panel 1600e to represent the ORU. The light can be pixelized, consist of particles, convey an icon or a symbol or the pedestrian's silhouette, etc. The location of the symbol at the panel 1600e may correspond to an angular location of the ORU as viewed from a center of the AV 10. The abstract symbol 1616 can move across the panel 1600e as the ORU moves across the field of view of the AV 10, or may remain in a fixed position. When tracking the spatial location of the ORU, the abstract symbol 1616 distinctly identifies the ORU. The ORU can view the panel 1600e to identify itself within the panel 1600e. This allows the ORU to know that the AV is aware of the ORU, which leads to an understanding in the ORU of the state of the AV. The ORU can then be assured of a level of safety with respect to the AV 10. Alternatively, as shown in panel 1600f, a silhouette or contour 1618 of the ORU can be shown at the panel in place of the abstract symbol. This allows the AV 10 to be able to identify itself, especially when multiple ORUs are being displayed at the panel 1600f.

Various messages can therefore be expressed symbolically as a visual signal. In addition, various submodalities of the message can be used to elicit a selected emotion or response at the ORU. Visual submodalities can include, for example, a size of a symbol, a speed of motion across a panel, a color of the message, a hue or intensity of the message, etc. For messages that flash or pulse, a temporal characteristic of the intensity of the pulse can be in the form of a selected temporal waveform, such as a sinusoidal waveform, a square waveform, a triangular waveform, a sawtooth waveform, etc.

A slow-moving message or pulsating symbol along the panel can elicit calm emotions from the ORU, while fast messages can excite/warn the ORU. The color of the message can also elicit various responses or emotions in the ORU. For example, a red color can elicit rage or anger from the ORU while a blue color can make the ORU calm and accepting. In various embodiments, the color of the messages disclosed herein use the color cyan. Cyan is a mixture of green, which elicits low feelings of anxiety, and blue, which elicit high feelings of calmness and tranquility. However, when a dangerous scenario is imminent, a warning message may be best displayed using orange, red or yellow, for example, although a radial, abrupt light flashing according to a temporally rectangular waveform in a cyan color can also convey the warning message.

The temporal characteristic also affects the emotion of the ORU. A slowly pulsing signal can induce calm in the ORU, while a quickly pulsing signal can induce excitement. The waveform used for pulsing can also affect emotions. A temporally rectangular waveform, which shows an abrupt change between on and off states, elicits strong or intense emotions, while a sinusoidal waveform elicits weaker or calmer emotions. Additionally, a high intensity (bright) signal can elicit intense emotions, while a low intensity (dim) signal elicits weak emotions.

The message can also be accompanied by auditory signals. Alternatively, the message can be broadcast using only auditory signals. The submodality of an auditory signal can also be selected to elicit an emotion in the ORU. For example, a loud signal can be exciting or scary to the ORU, while a soft signal can be calming. The pitch of the auditory signal can also be selected according to the needs of the message. For a pulsed auditory signal, the waveform of the pulsing elicits emotions in the same manner as discussed with respect to visual signals.

Figure 17:
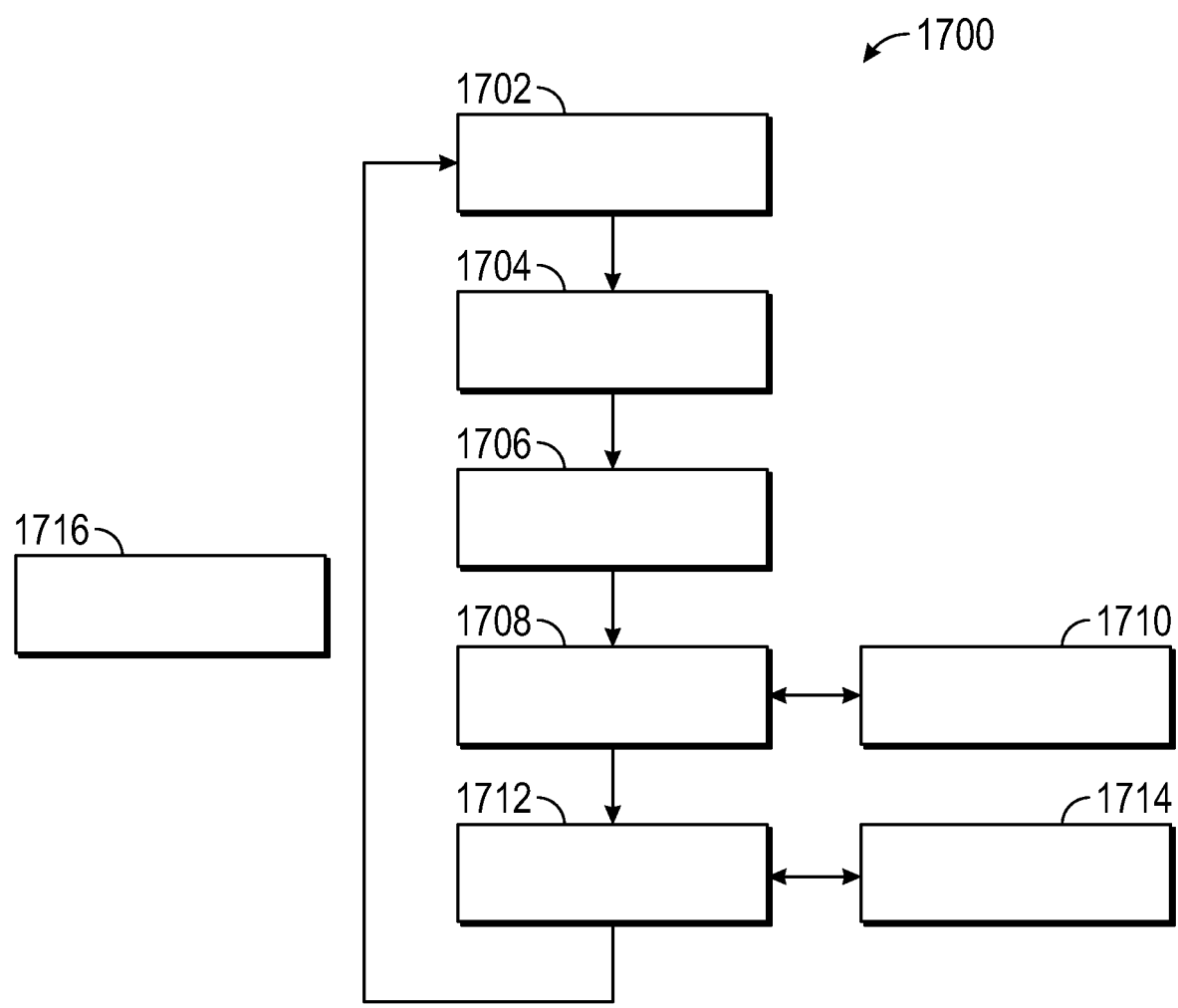
FIG. 17 shows an illustrative sequence of messages that can be expressed to a ORU during an encounter with the ORU.

FIG. 17 shows an illustrative sequence 1700 of messages that can be expressed to a ORU during an encounter with the ORU. The sequence 1700 includes a drive mode 1702 for autonomous driving. Upon seeing the ORU, the AV 10 sends out a message from an awareness mode 1704 indicating that the AV sees and is aware of the ORU. The AV 10 can then enter a deceleration and stopping mode 1706 and sends a signal indicating its intention to stop and decelerate. Once in a stopped mode (Wait) 1708, the AV 10 can also participate in a protection mode 1710 in which the AV 10 can take actions to alert other vehicles to presence of the ORU.

When the AV 10 starts moving again to leave the scene, the AV can be in an intent to drive mode 1712 in which it sends a message to indicate its intent to accelerate. If necessary, the AV 10 can enter an escalation mode 1714 to alert those ORUs that are not paying attention to the signals. At any time, the AV 10 can enter a warning mode 1716 to indicate a warning to the ORU.

Figure 18:
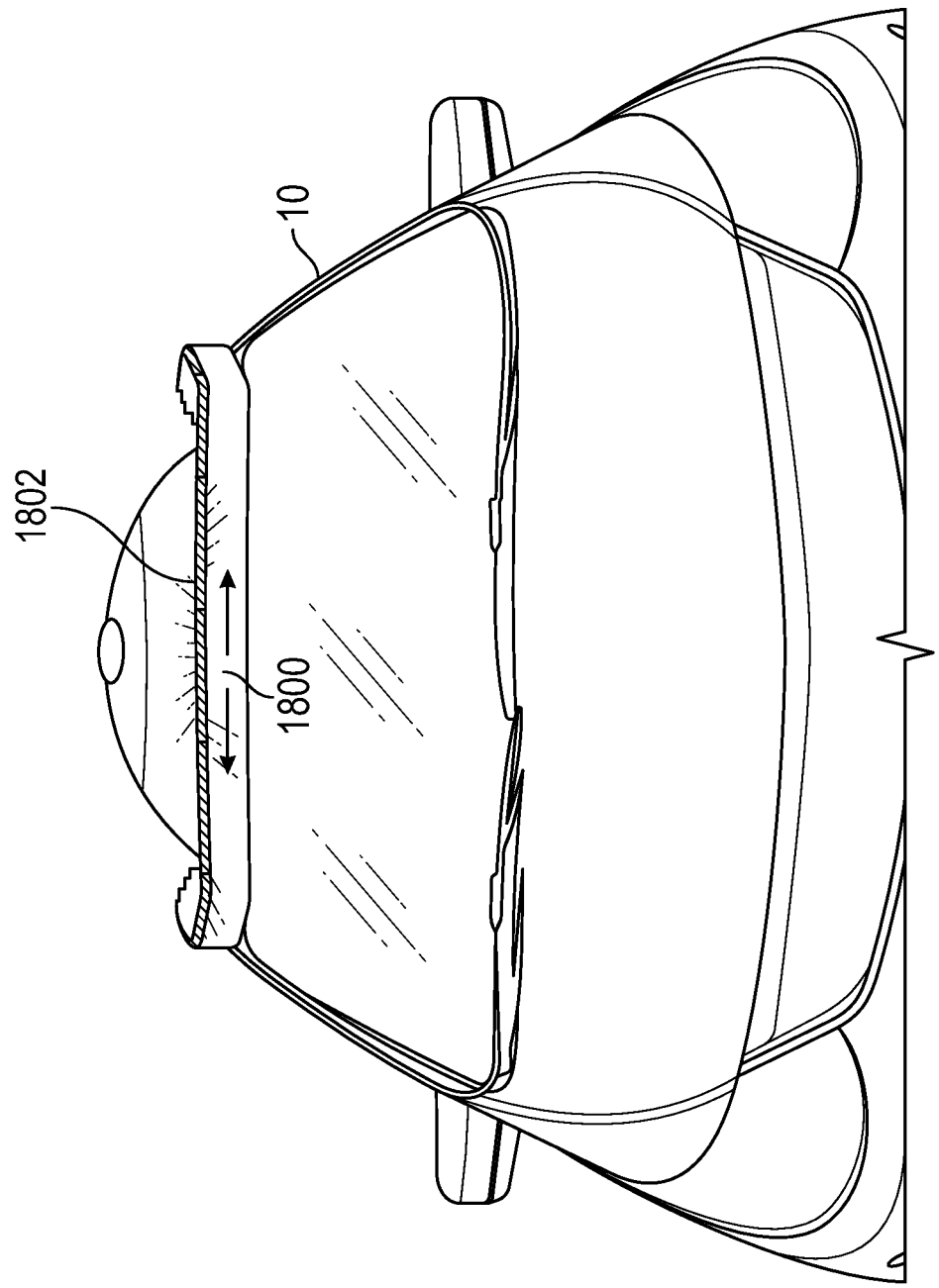
FIG. 18 shows a panel of the automated vehicle displaying an illustrative visual message for a drive mode.

FIG. 18 shows a panel 1800 of the AV 10 displaying an illustrative visual message for the drive mode 1702 of FIG. 17 in an embodiment. A cyan light made of particles on the panel extends along a line 1802 at a top of the panel 1800. The intensity of the cyan light can be fixed or changing between low intensity regions and slightly higher intensity regions. Different light schemes and animations (e.g., sparkles, moving dots and lines) indicate that the car is sensing the external world. The intensity of the light can vary sinusoidally in space along the horizontal axis. The intensity regions diverge from a center of the panel, with a left half of the panel including a flow towards the left end of the panel and the right half of the panel including a flow towards the right end of the panel. The flow on the right side of the panel is a mirror reflection of the flow of the left side of the panel.

In Level 4 and Level 5 vehicles, the drive mode 1702 can also be displayed using a single LED string and/or in a windshield display. In the windshield display, an extremely subtle pulsing blue light (at about 20% of maximum light intensity) can be used to indicate the vehicle is in a drive mode. The pulse rate of the blue light can give a notion to the ORU that the car is operating and/or aware. The pulse rate can deviate to indicate a difficulty at the AV. For a plurality of AVs pulsating in a synchronous manner, a deviation from this synchronous pulsating by a selected AV can be quickly perceived by an ORU in order to allow the ORU to recognize which AV is experiencing the difficulty. In addition, a light beam can be generated to create a road projection, such as a subtle glow of cyan light creating an oval shape, to mark an area of safety for the vehicle on the road when the car is driving. The area of safety can indicate a safe braking distance of the vehicle, for example.

Figure 19:
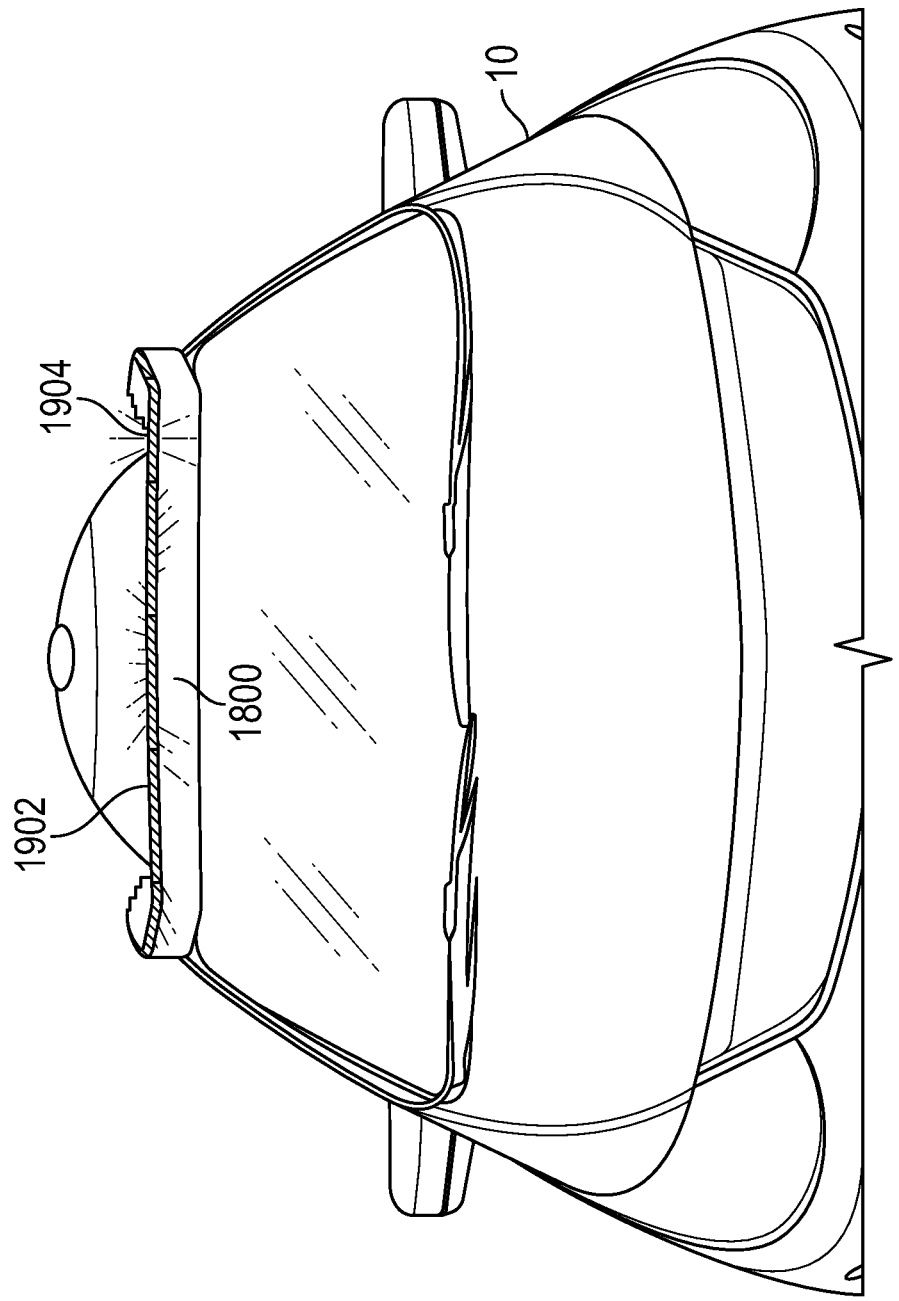
FIG. 19 shows the panel displaying an illustrative visual message for an awareness mode.

FIG. 19 shows the panel 1800 displaying an illustrative visual message for an awareness mode 1704. An intensity of the line 1902 increases at a selected location of the panel 1800 or within a selected region 1904 of the panel 1800, imitating a blink or wink at the ORU. If the AV 10 is operating in a non-tracking mode, the selected region 1904 can be the center of the panel 1800, for example. If the AV is operating in a tracking mode, the selected region 1904 can be at a location of the panel 1800 that tracks or corresponds with a location of the ORU within the field of view of the AV. Projecting a representation of the ORU at the panel, in one form or another, acknowledges to the ORU that the AV 10 has awareness and starts a communication between the AV 10 and the ORU. When represented in a windshield display, the particles can become slightly brighter and/or denser for a fraction of a second to grab the attention of the ORU.

Figure 20:
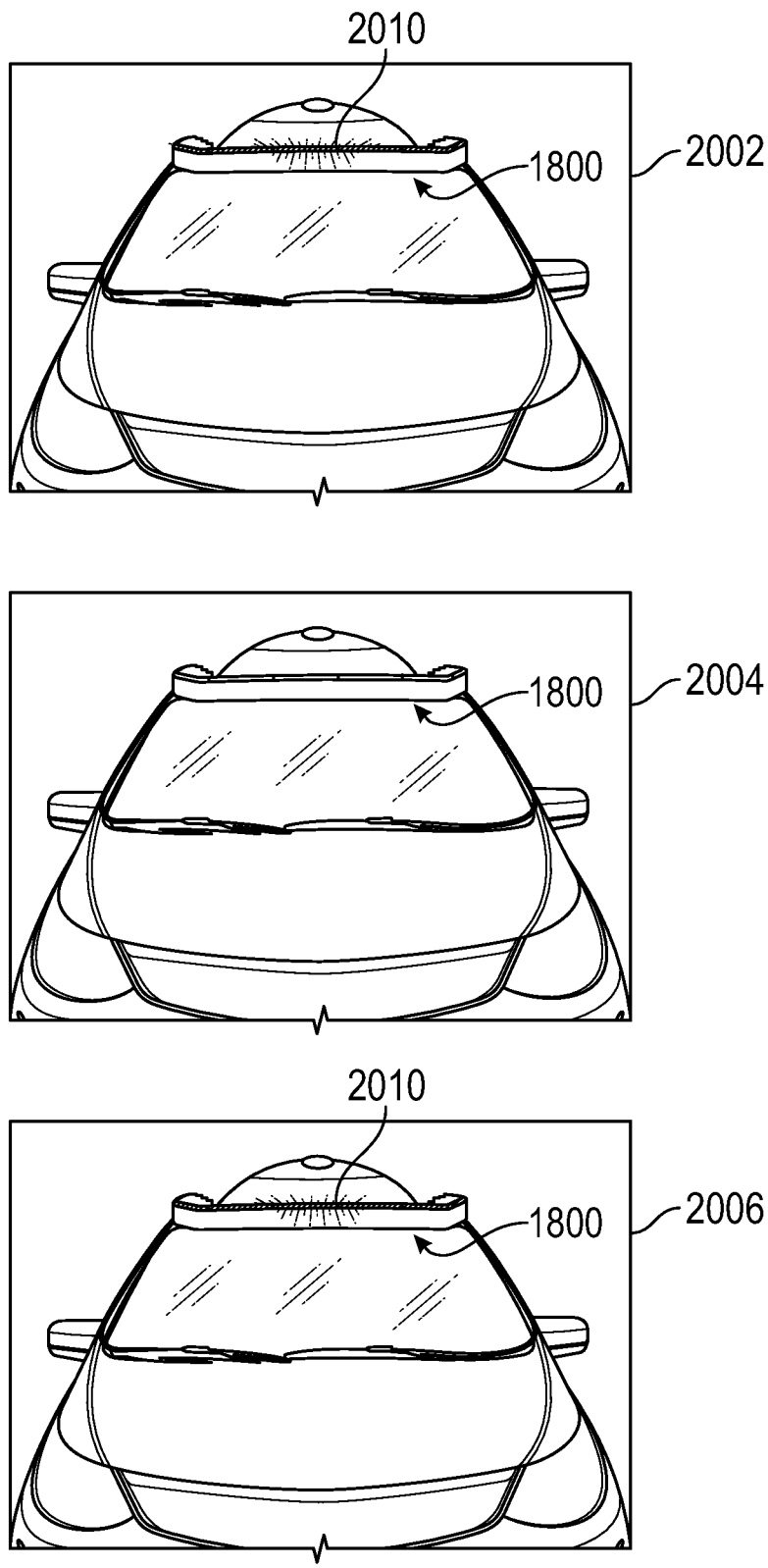
FIG. 20 shows temporally spaced images of the panel displaying a visual message to communicate an intent-to-stop and deceleration mode.

FIG. 20 shows temporally spaced images of the panel 1800 displaying a visual message to communicate an intent-to-stop and deceleration mode 1706. The line 2010 of the panel 1800 flashes to get the attention of the ORU. Images 2002, 2004, 2006 shows a time progression representing a flashing line. Image 2002 shows the flashing line 2010 in an ON state. Image 2004 shows a blank panel indicating an OFF state. Image 2006 shows the flashing line 2010 in a subsequent ON state. The temporal aspect of the line 2010 is such that the intensity across the line 2010 flashes according to a triangular waveform. In various embodiments, the attention of the ORU can be attracted by converging particles into the line 2010 and changing the intensity of the line according to a temporally triangular waveform. The color of the line 2010 remains as the cooler cyan color, thereby attracting attention of the ORU without inciting alarm. When represented in a windshield display of a Level 2 or Level 3 vehicle, the display will pulsate once in the upper (shaded) section of the windshield display. When represented in a windshield display of a Level 4 or Level 5 vehicle, the center of the display or other selected area can also pulsate. A suitable sound or sound file can be played to accompany the visual message to indicate intent-to-stop and/or deceleration.

FIG. 21 shows the panel 1800 displaying a visual message indicating a deceleration and stopping mode 1706. Images 2102, 2104, 2106 and 2108 shows a time progression illustrating deceleration. In image 2102, the line 2010 is at the top of the panel. Image 2104 shows the line 2010 in the middle of the panel 1800 as it drops from the top to the bottom of the panel. Image 2106 shows the line 2010 having reached the bottom of the panel 1800. In image 2108, once the line 2010 reaches the bottom of the panel 1800, it can become slightly stronger (i.e., more intense) and then fade away. Alternatively, the panel can display a flow of intensity regions that converge on the center of the panel 1800. A short sound can be directed at the ORU to supplement the visual message in order to draw the attention of inattentive pedestrians to the traffic scenario. The sound may play once to convey the stopped state. If the panel 1800 is a single LED strip, the deceleration can be represented by having the flow of light converging at the center of the LED strip. For messages shown in windshield displays for Level 2 or Level 3 vehicles, light intensity increases slowly in the upper section of the windshield display (up to 60% of maximum light intensity) and its pulsation becomes stronger. In large windshields in Level 4 or Level 5 vehicles, this may take place in the center of the display, or in other areas depending on the specific design. In both cases, the highlighted area will become bigger as the car approaches the ORU to emphasize the looming effect of the car. In case that road projection marks the safety area of the vehicle on the road when the car is driving, the subtle glow will also increase in size when approaching the ORU to strengthen the perception of the vehicle's approach and decrease in size when the vehicle stops.

Figure 22:
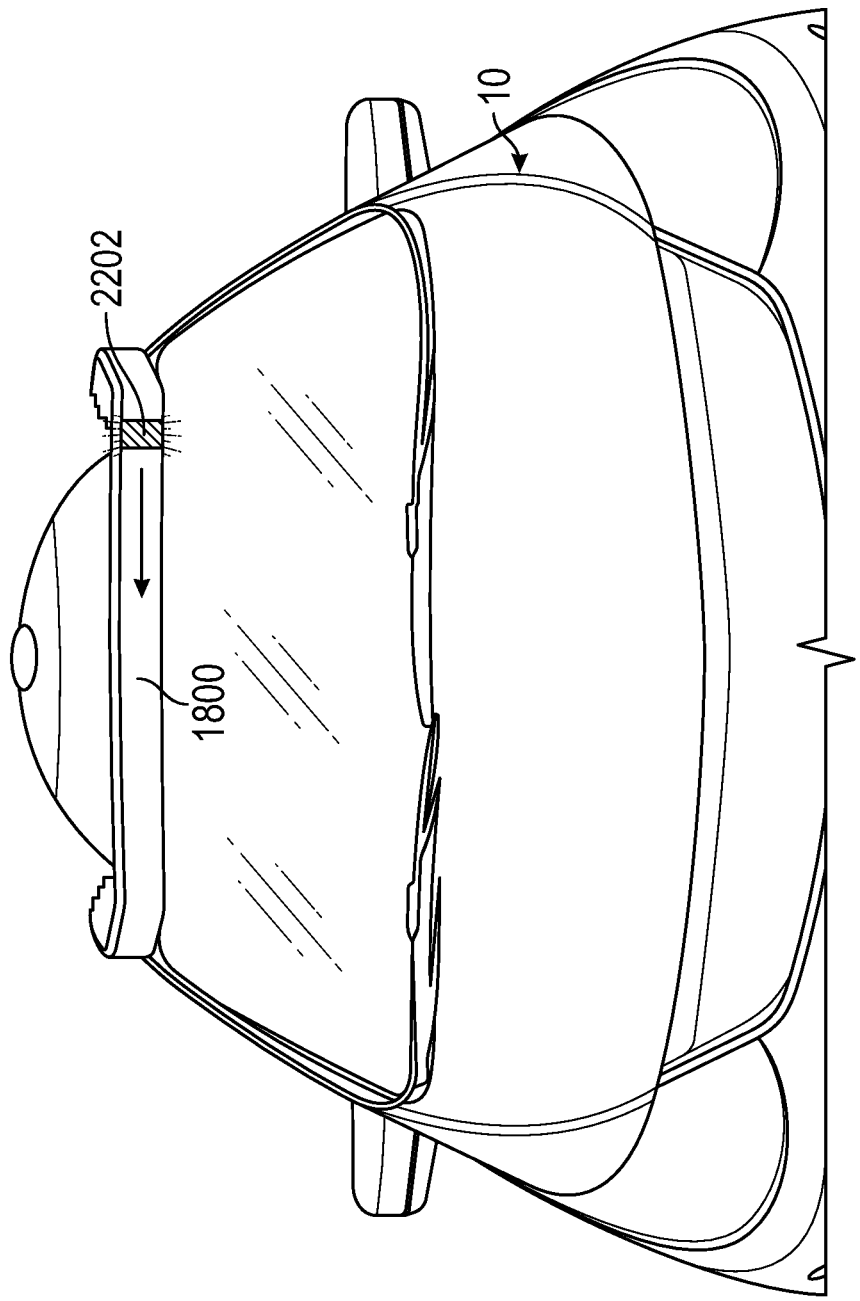
FIG. 22 shows the panel displaying a visual message for a stopped mode, tracking the spatial location of the ORU.

FIG. 22 shows the panel 1800 displaying a "waiting" visual message for a stopped mode 1708. In a non-tracking mode of FIG. 17, a vertical stripe 2202 pulsates in a center of the panel 1800. In a tracking mode, the vertical stripe crosses the panel 1800 horizontally following the location of the ORU. A representational tracking of the ORU's motion can enable the ORU to feel safe. When in the non-tracking mode, a pulsating light at the center of the panel can send a message that the AV 10 is waiting so that the ORU may cross the road. The color of the representation can change color, for example, to green, to indicate awareness. A "waiting" state can be represented in Level 4 and Level 5 vehicles on a single LED string and/or in a windshield display. When a windshield display is used to display the message, the light shifts to a steady state. This implies that the AV 10 is in an attentive mode and awaiting a response from the ORU. The canvas of the windshield display presents additional information to the ORU by means of text/icons/silhouettes, which can be static or animated.

Figure 23:
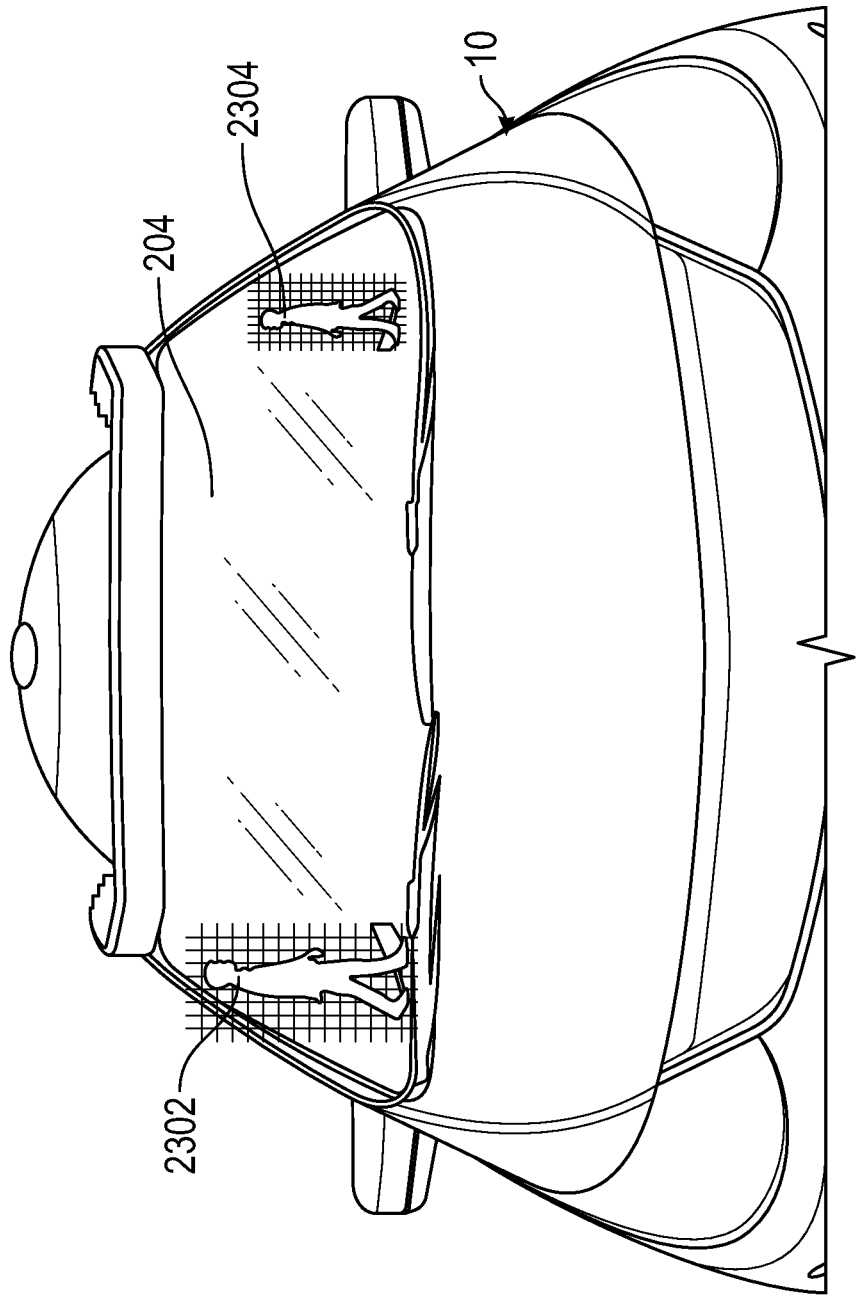
FIG. 23 shows representations of various ORUs on a windshield of a Level 4 or Level 5 automated vehicle.

FIG. 23 shows representations 2302 and 2304 of various ORUs on a windshield 204 of the AV 10. The representations are generally used for Level 4 and Level 5 vehicles. The representations 2302 and 2304 are displayed to allow the ORUs to feel safe in the knowledge that the AV 10 is aware of them. Visual representations of the ORU can come in various degrees of granularity in in order to signify a distance between the AV and the ORU. For example, the representation can have low resolution (coarse granularity) for ORUs at a distance, and high resolution (fine granularity)

for ORUs in close proximity to the AV. In alternate embodiments, the representations can be shown in an upper section of the windshield display.

The AV 10 can also display several messages while in protection mode 1710 of FIG. 17. An "I'm giving you the right of way" or an "I'm respecting your space and will not act against you" can be indicated by having the representation of the ORU mimic the actions of the ORU. Thus, when the ORU appears to be stuck or uncertain of the AV's intentions, the representation of the ORU can be moved gently back and forth in the panel. The ORU tends to mimic this motion by swaying back and forth, thereby forming an emotional bond between the AV and the ORU and giving them the confidence to start walking, while feeling safe. The visual representation on the external display can subtly pulse/shine/increase in size/change color and a mild directional sound can be given to boost the pedestrian's confidence as long as it does not mask the sound of the surrounding traffic. A road projection can be shown on the ground to indicate where the assumed responsibility of the AV 10 ends. In various embodiments, the visual message for yielding a right of way to the ORU can be communicated by displaying nothing at the vehicle.

Figure 24:
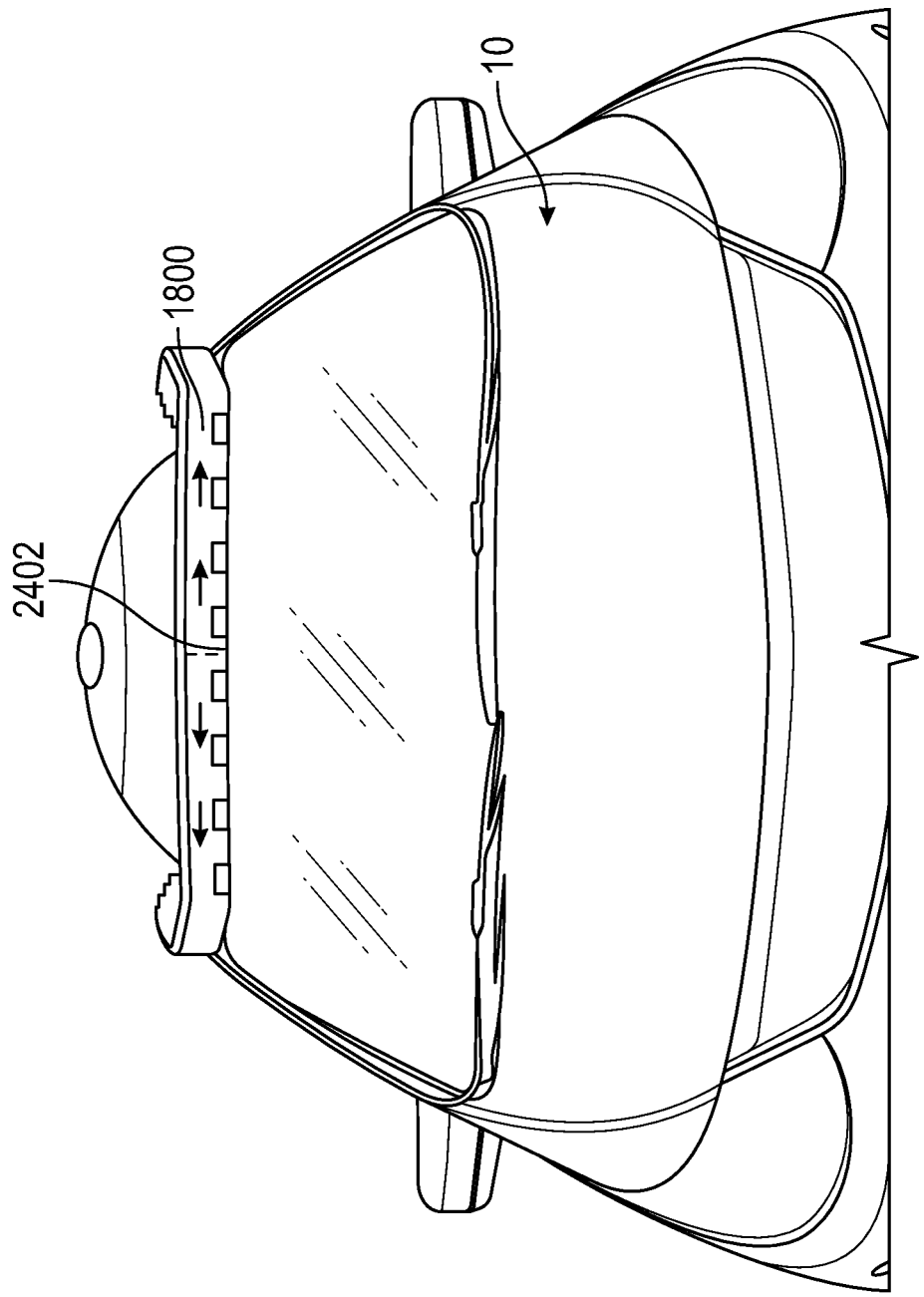
FIG. 24 shows the panel displaying a visual message for an intention to drive mode.

FIG. 24 shows the panel 1800 displaying a visual message for an intention to drive mode 1712 of FIG. 17. Dashed lines 2402 propagate outward from the center of the panel 2400 in a single flash. A short sound directed at the ORU can supplement the visual message in order to draw the attention of inattentive pedestrians to the traffic scenario. The AV 10 can warn the ORU to stop by transmitting a sound or speech. This "intent to drive" message can be represented in Levels 2-5 vehicles on a single LED string and/or in windshield displays. For Level 2 or Level 3 vehicles, when a windshield display is used, an upper shaded section of the windshield display can pulsate twice. The driver can apply mild force on the gas pedal in order to activate the related message at the AV 10. In Level 4 or Level 5 vehicles, a center of the windshield display or other selected region (including the projection onto the road) can also pulsate.

Figure 25:
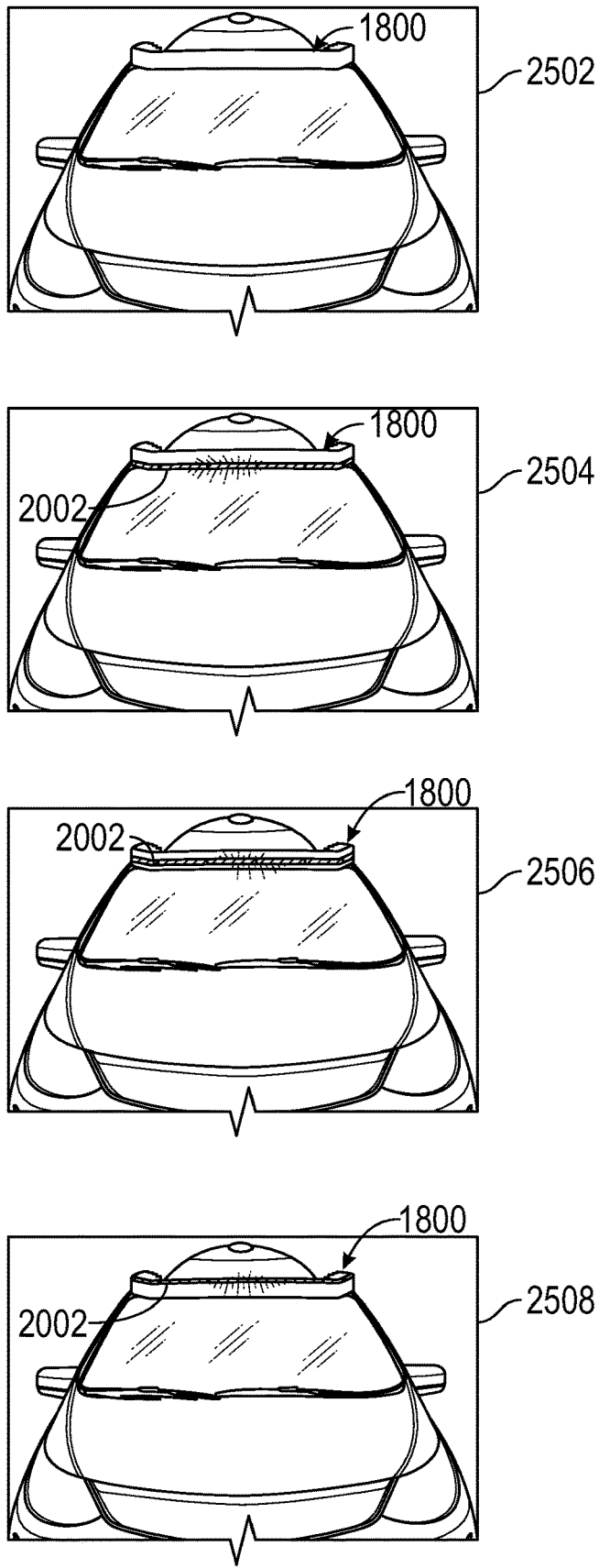
FIG. 25 shows the panel displaying a visual message for an acceleration mode.

FIG. 25 shows the panel 1800 displaying a visual message for the acceleration mode. Images 2502, 2504, 2506 and 2508 shows a time progression illustrating acceleration. In image 2502, the panel is empty, showing no line. In image 2104 the line 2002 appears as a flash at a bottom of the panel 1800. Image 2106 shows the line 2002 in the middle of the panel 1800 as it rises from the bottom to the top of the panel. In image 2508, the line 2002 reaches the top of the panel 1800. The ORU's representation can disappear from the panel (such as in image 2502) and mild sound may be given to make the change of state clear to the ORU. A directional sound can be added if the AV notices another ORU approaching the cross zone. In another embodiment, this "acceleration" message can be represented in Levels 2-5 vehicles on a single LED string and/or in windshield displays. When a windshield display is used, the light on windshield display can gradually fade until it reaches 20% of maximum light intensity. A suitable sound or sound file can be played to accompany the visual message to indicate intent-to-drive and/or acceleration.

Figure 26:
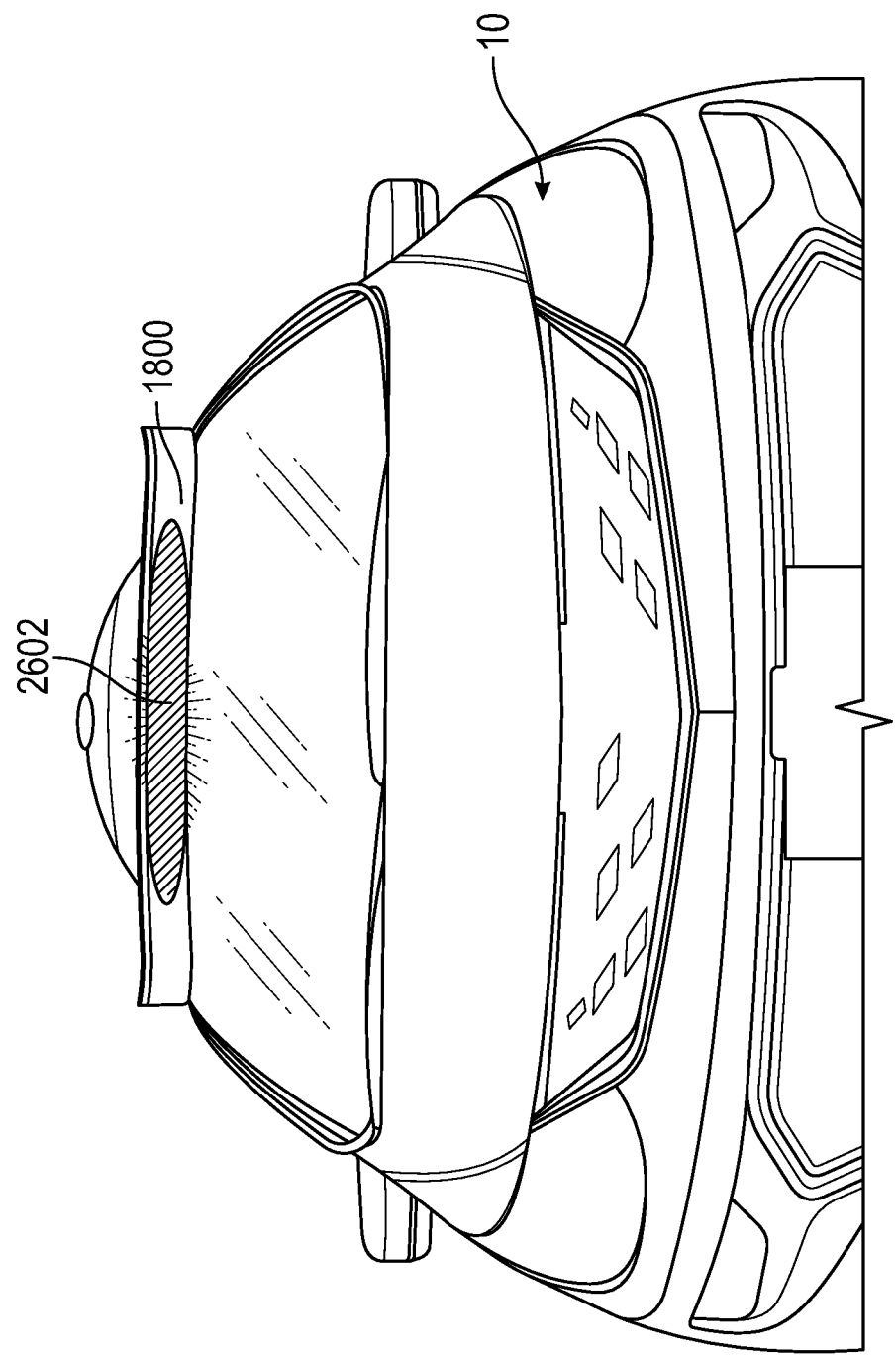
FIG. 26 shows the panel displaying a visual warning for a failure-to-stop mode.

FIG. 26 shows the panel 1800 displaying a visual warning for the warning mode 1716. If a collision is determined to be imminent, the AV 10 can send its intentions to the ORU by flashing the panel 1800 in an attention capturing manner, such as by flashing a signal 2602 according to a temporally rectangular waveform across the entirety of the panel 1800 or by harshly blinking the vertical stripe which is tracking a specific pedestrian. The color red can be used. A warning sound (e.g., a car horn or a dedicated warning sound file) can play to attract the attention of the ORU. Road projection area 210 increases in size to deter ORUs from entering the area. The estimated stop line of the car can be projected on the road to deter the ORU from entering the dangerous zone. If the AV 10 determines that a collision is not imminent, the AV 10 can decide not to stop. Both the AV 10 and the ORU can continue to advance at their current velocities and space trajectories.

In dangerous situations where the AV 10 cannot stop, the light intensity in a windshield display can increase to 100% of maximum light intensity. The windshield display can flash in a harsh manner, and the color of the light can be changed to red, orange or yellow. A central car horn may be activated. In dangerous situations in which a silhouette is being presented at the windshield display, the silhouette itself may flash and a warning sound can be activated. A rear projection display or panel can display a message to communicate the dangerous state to vehicles behind the AV 10.

Figure 27:
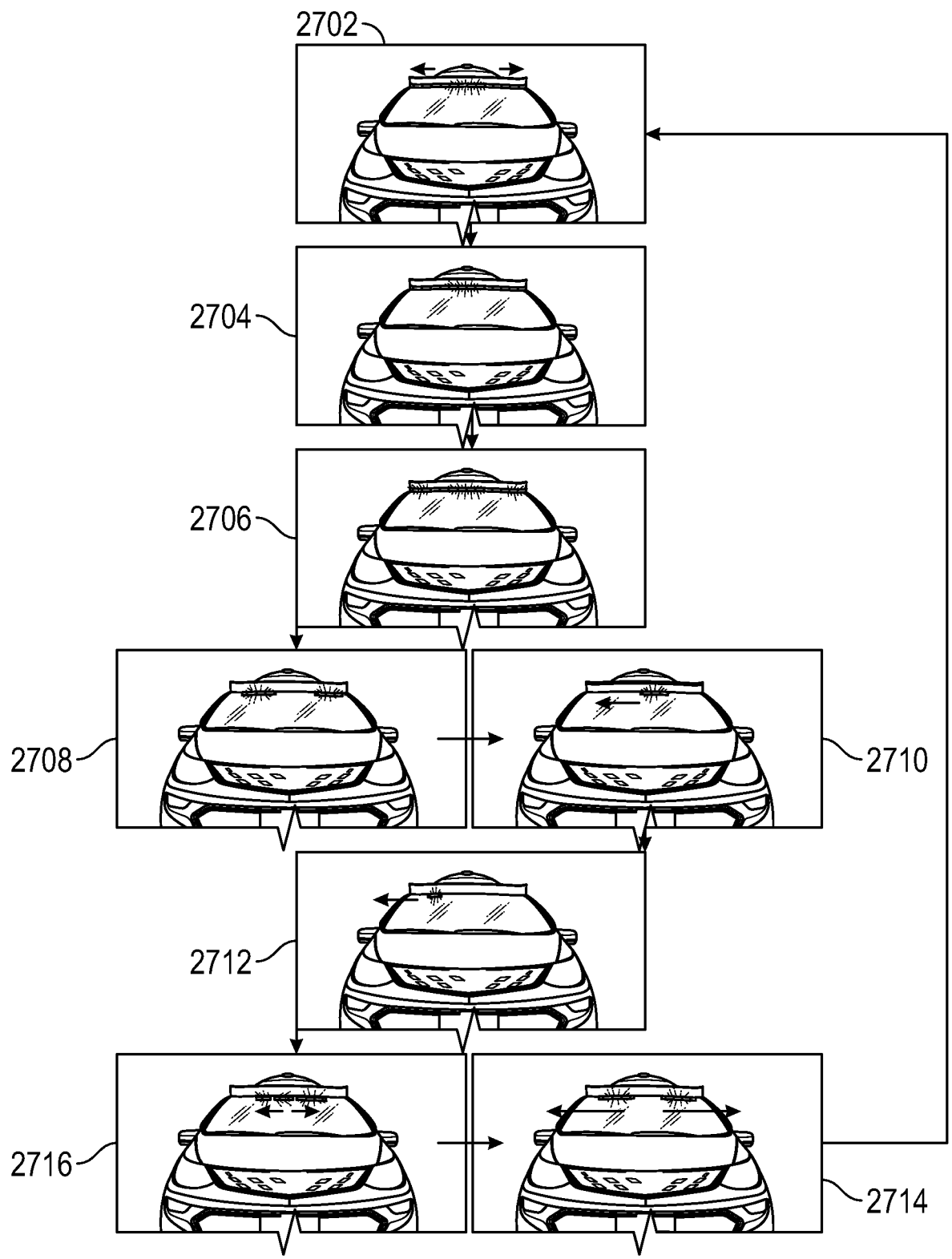
FIG. 27 shows a series of images illustrating a sequence of messages in a communication protocol displayed using a LED string.

FIG. 27 shows progression through a communication protocol for an AV 10 using a single LED string across a windshield of the vehicle. Image 2702 shows a message for a general driving mode. The LED string displays an extremely subtle pulsing light to indicate the vehicle is in the driving mode. Image 2704 shows a message for an awareness mode. A segment of the LED string can flash or become brighter in order to indicate the vehicles awareness to the ORU. The segment can be at an angular location that matches or indicates the location of the ORU.

Image 2706 shows a message for an intent to stop and deceleration mode. The lights can be coordinates to show a set of light particles converging on a selected location, such as a center of the vehicle. Image 2708 shows a message for a stop and wait mode. LED segments can be pulsed at low intensity to indicate this mode. Image 2710 shows a tracking mode as a group of LEDs are lit to indicate the location of an ORU. Image 2712 shows an end of the tracking mode as the ORU leaves the street. Image 2714 shows an intent-to-accelerate mode in which LED lights are shown slowly diverging from a central point of the LED string. Image 2716 shows an acceleration mode in which the LED lights diverge from the central point at a more rapid pace.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating an automated vehicle, comprising:
   identifying an other road user (ORU) with respect to the automated vehicle;
   determining a state of the ORU and a context of the ORU;
   determining an intended action for the vehicle based on the state of the ORU and the context of the ORU; and
   communicating a message indicating the intended action as a visual signal at a display of the vehicle for viewing by the ORU, wherein the visual signal is an animation adapted to a level of vulnerability assessed with respect to the ORU and wherein the display is at least one of: (i) a panel of the automated vehicle; (ii) a panel within a windshield of the automated vehicle; (iii) an LED strip, and (iv) a projector illuminating an area of a road.

2. The method of claim 1, wherein the intended action is selected from a communication protocol between the automated vehicle and the ORU at a lane crossing.

3. The method of claim 2, further comprising identifying the lane crossing using a mapping application and activating a communication protocol based on the location of the ORU with respect to the lane crossing when the automated vehicle approaches the lane crossing of the mapping application.

4. The method of claim 1, wherein the visual signal is parameterized by at least one of: (i) a shape of the visual signal; (ii) a size of the visual signal; (iii) a density of the visual signal; (iv) an intensity of the visual signal; (v) a contrast level of the visual signal; (vi) a granularity or resolution of the visual signal; (vii) a color of the visual signal; (viii) a hue of the visual signal; (ix) a graphic pattern of the visual signal; (x) a direction of movement of the visual signal; (xi) a speed of directional movement of the visual signal; (xii) a timing of the visual signal; (xiii) a duration of the visual signal; (xiv) a period of the visual signal (repetition rate in a repeated visual signal pattern); (xv) a repetition number of the visual signal; and (xvi) a waveform of the pulsation of the visual signal (rectangular, triangular, sinusoidal, sawtooth).

5. The method of claim 1, wherein the visual signal comprises a representation of the ORU, wherein a granular resolution of the ORU increases as a distance between the automated vehicle and ORU decreases.

6. The method of claim 1, further comprising increasing an intensity and reducing a period of the visual signal when a subjective threat is assessed with respect to the ORU.

7. The method of claim 1, wherein the message corresponds to a mode of the automated vehicle that is at least one of: (i) a driving mode; (ii) an awareness mode; (iii) an intent to stop mode; (iv) a deceleration mode; (v) a warning mode; (vi) a stopping mode; (vii) a stopped and waiting mode; (viii) a yielding right of way mode; (ix) an ORU space respecting mode; (x) an ORU protection mode; (xi) an acceleration warning mode; (xii) an intent to drive mode; and (xiii) an acceleration mode.

8. The method of claim 1, further comprising communicating the message to perform at least one of: (i) expressing a general awareness of the road using particles on a display panel having an intensity that changes according to a temporally sinusoidal waveform; (ii) attracting an attention of the ORU by converging the particles into a line having an intensity that changes according to a temporally triangular waveform; (iii) indicating one of acceleration and deceleration by moving a line pattern or dashed line pattern at least one of vertically or horizontally; (iv) sending a warning by flashing a radially expanding light, pulsing according to a temporally rectangular waveform; and (v) enhancing a motion of the automated vehicle to the ORU without visually capturing the attention of the ORU.

9. The method of claim 1, further comprising projecting an image at a location of the road to indicate a safety zone with respect to the automated vehicle.

10. A system for operating an automated vehicle, comprising:
a sensor of the automated vehicle for monitoring an other road user (ORU) external to the automated vehicle; and
a display of the automated vehicle, wherein the display is at least one of: (i) a panel of the automated vehicle; (ii) a panel within a windshield of the automated vehicle; (iii) an LED strip; and (iv) a projector illuminating an area of a road;
a processor configured to:
determine a state of the ORU and a context of the ORU;
determine an intended action for the vehicle based on the state of the ORU and the context of the ORU; and
communicate a message indicating the intended action as a visual signal at the display for viewing by the ORU based, wherein the visual signal is an animation adapted to a level of vulnerability assessed with respect to the ORU.

11. The system of claim 10, wherein the message is selected from a communication protocol between the automated vehicle and the ORU at a lane crossing.

12. The system of claim 11, wherein the processor is further configured to identify a lane crossing using a mapping application and activating a communication protocol based on the location of the ORU with respect to the lane crossing when the automated vehicle approaches the lane crossing of the mapping application.

13. The system of claim 10, wherein the visual signal is parameterized by at least one of: (i) a shape of the visual signal; (ii) a size of the visual signal;
(iii) a density of the visual signal; (iv) an intensity of the visual signal; (v) a contrast level of the visual signal; (vi) a granularity or resolution of the visual signal; (vii) a color of the visual signal;
(viii) a hue of the visual signal; (ix) a graphic pattern of the visual signal; (x) a direction of movement of the visual signal; (xi) a speed of directional movement of the visual signal; (xii) a timing of the visual signal; (xiii) a duration of the visual signal; (xiv) a period of the visual signal (repetition rate in a repeated visual signal pattern); (xv) a repetition number of the visual signal; and (xvi) a waveform of the pulsation of the visual signal (rectangular, triangular, sinusoidal, sawtooth).

14. The system of claim 10, wherein the visual signal comprises a representation of the ORU having granular resolution that increases as a distance between the automated vehicle and ORU decreases.

15. The system of claim 10, wherein the processor is further configured to coordinating the visual signal with an audio signal.

16. The system of claim 10, wherein the message corresponds to a mode of the automated vehicle that is at least one of: (i) a driving mode; (ii) an awareness mode; (iii) an intent to stop mode; (iv) a deceleration mode; (v) a warning mode; (vi) a stopping mode; (vii) a stopped and waiting mode; (viii) a yielding right of way mode; (ix) an ORU space respecting mode; (x) an ORU protection mode; (xi) an acceleration warning mode; (xii) an intent to drive mode; and (xiii) an acceleration mode.

17. The system of claim 10, wherein the processor is further configured to communicate the message by performing at least one of: (i) expressing a general awareness of the road using particles on a display panel having an intensity that changes according to a temporally sinusoidal waveform; (ii) attracting an attention of the ORU by converging the particles into a line having an intensity that changes according to a temporally triangular waveform; (iii) indicating one of acceleration and deceleration by moving a line pattern or dashed line pattern at least one of vertically or horizontally; (iv) sending a warning by flashing a radially expanding light, pulsing according to a temporally rectangular waveform; and (v) enhancing a motion of the automated vehicle to the ORU without visually capturing the attention of the ORU.

18. The system of claim 10, wherein the processor is further configured to project an image at a location of the road to indicate a safety zone with respect to the automated vehicle.

19. The method of claim 1, wherein a submodality of the animation is selected to elicit a desired emotion in the ORU.

20. The system of claim 10, wherein the processor is further configured to select a submodality of the animation to elicit a desired emotion in the ORU.

\* \* \* \* \*